United States Patent
Ishikawa et al.

(10) Patent No.: US 9,495,025 B2
(45) Date of Patent: Nov. 15, 2016

(54) DEVICE, METHOD AND STORAGE MEDIUM STORING PROGRAM FOR CONTROLLING SCREEN ORIENTATION

(71) Applicant: KYOCERA CORPORATION, Kyoto-shi, Kyoto (JP)

(72) Inventors: Shuji Ishikawa, Yokohama (JP); Natsuhito Honda, Yokohama (JP); Atsuo Chiba, Yokohama (JP); Mitsutoshi Kobayashi, Yokohama (JP); Nayu Nomachi, Yokohama (JP); Hiroshi Tsuruta, Yokohama (JP); Mitsutaka Hata, Yokohama (JP); Hiroto Yahagi, Yokohama (JP); Kenji Abe, Yokohama (JP); Yoshiyuki Shinoda, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 14 days.

(21) Appl. No.: 13/851,551

(22) Filed: Mar. 27, 2013

(65) Prior Publication Data

US 2013/0265250 A1    Oct. 10, 2013

(30) Foreign Application Priority Data

Mar. 27, 2012 (JP) .................. 2012-072099

(51) Int. Cl.
*G06F 3/041* (2006.01)
*G06F 3/0488* (2013.01)

(52) U.S. Cl.
CPC ............. *G06F 3/041* (2013.01); *G06F 3/0488* (2013.01); *G06F 2200/1614* (2013.01)

(58) Field of Classification Search
CPC .............. G06F 2200/1614; G06F 2200/1637; G06F 3/04845; G06F 3/041; G06F 3/0488; G09G 2340/0492
USPC .................. 345/173, 619, 649–659; 715/764
See application file for complete search history.

(56) References Cited

U.S. PATENT DOCUMENTS

| | | | |
|---|---|---|---|
| 7,978,176 B2 * | 7/2011 | Forstall ................. | G06F 1/1626 345/158 |
| 7,978,182 B2 * | 7/2011 | Ording ................. | G06F 1/1626 345/173 |
| 9,015,640 B2 * | 4/2015 | de Leon ................. | G06F 3/017 345/173 |

(Continued)

FOREIGN PATENT DOCUMENTS

| | | |
|---|---|---|
| JP | 2002-140159 A | 5/2002 |
| JP | 2009-223469 A | 10/2009 |

(Continued)

OTHER PUBLICATIONS

Office Action mailed Jul. 21, 2015, corresponding to Japanese patent application No. 2012-072099.

(Continued)

*Primary Examiner* — Lun-Yi Lao
*Assistant Examiner* — Ibrahim Khan
(74) *Attorney, Agent, or Firm* — Hauptman Ham, LLP

(57) ABSTRACT

According to an aspect, a device includes: a display unit for displaying a screen; a sensor for detecting an inclination of the display unit; an operating unit for detecting an operation; and a controller. The controller changes an orientation of the screen depending upon the inclination detected through the sensor and the operation detected through the operation unit.

20 Claims, 18 Drawing Sheets

(56) References Cited

U.S. PATENT DOCUMENTS

| | | | |
|---|---|---|---|
| 9,122,457 B2* | 9/2015 | Lu | G06F 1/1694 |
| 2008/0165144 A1* | 7/2008 | Forstall | G06F 1/1626 |
| | | | 345/173 |
| 2008/0165160 A1 | 7/2008 | Kocienda et al. | |
| 2009/0002391 A1* | 1/2009 | Williamson | G06F 1/1626 |
| | | | 345/619 |
| 2011/0012926 A1* | 1/2011 | Kerr | G06F 1/1626 |
| | | | 345/649 |
| 2011/0109538 A1* | 5/2011 | Kerr | G09G 5/36 |
| | | | 345/156 |
| 2015/0116232 A1 | 4/2015 | Hayakawa | |

FOREIGN PATENT DOCUMENTS

| | | |
|---|---|---|
| JP | 2013-97400 A | 5/2013 |
| WO | 2008086302 A1 | 7/2008 |
| WO | 2012/004852 A1 | 1/2012 |

OTHER PUBLICATIONS

Office Action mailed Oct. 20, 2015, corresponding to Japanese patent application No. 2012-072099, for which an explanation of relevance is attached.

* cited by examiner

DEVICE, METHOD AND STORAGE MEDIUM STORING PROGRAM FOR CONTROLLING SCREEN ORIENTATION

CROSS-REFERENCE TO RELATED APPLICATIONS

This application claims priority from Japanese Application No. 2012-072099, filed on Mar. 27, 2012, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Some of the touch screen devices include a sensor for detecting an orientation of a housing. The touch screen device changes an orientation of a screen displayed on a display unit according to an orientation of the touch screen device by detecting an inclination of the housing. Although the touch screen device may automatically change the orientation of the screen by changing the orientation of the screen according to the orientation of the housing, there is a case in which the orientation of the screen is different from that intended by a user. A device provided with a display unit other than the touch screen device has a similar problem.

For the foregoing reasons, there is a need for a device, a method, and a program capable of improving operability of operation performed while looking at the screen of the display unit.

SUMMARY

According to an aspect, a device includes: a display unit for displaying a screen; a sensor for detecting an inclination of the display unit; an operating unit for detecting an operation; and a controller. The controller changes an orientation of the screen depending upon the inclination detected through the sensor and the operation detected through the operation unit.

According to another aspect, a method is for controlling a device provided with a sensor, an operating unit, and a display unit. The method includes: displaying a screen on the display unit; detecting an inclination of the display unit through the sensor; and changing an orientation of the screen depending upon the inclination detected upon the detecting and an operation detected through the operation unit.

According to another aspect, a non-transitory storage medium stores a program. When executed by a device provided with a sensor, an operating unit, and a display unit, the program causes the device to execute: displaying a screen on the display unit; detecting an inclination of the display unit through the sensor; and changing an orientation of the screen depending upon the inclination detected upon the detecting and an operation detected through the operation unit.

DETAILED DESCRIPTION

Exemplary embodiments will be explained in detail below with reference to the accompanying drawings. A smartphone will be explained below as an example of a device provided with a touch screen.

Figure 1:
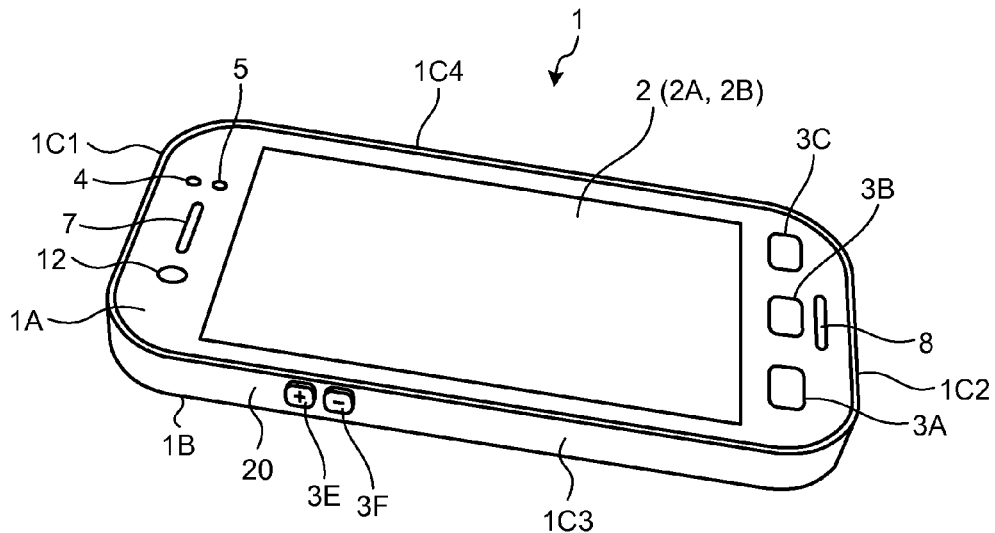
FIG. 1 is a perspective view of a smartphone according to an embodiment.
Figure 2:
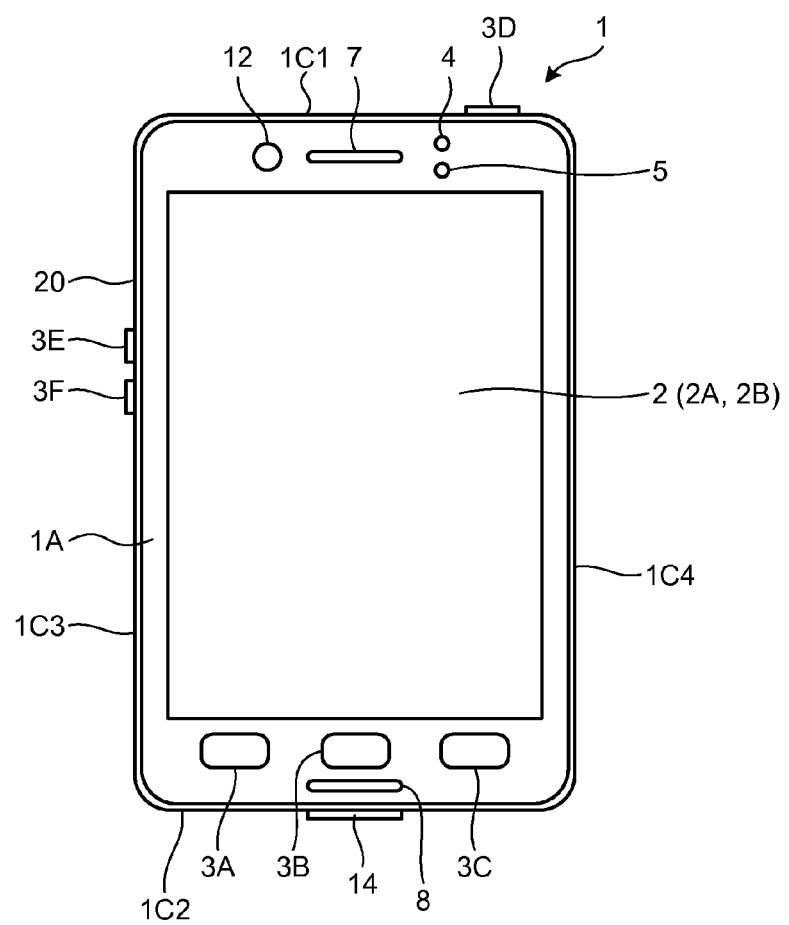
FIG. 2 is a front view of the smartphone.
Figure 3:
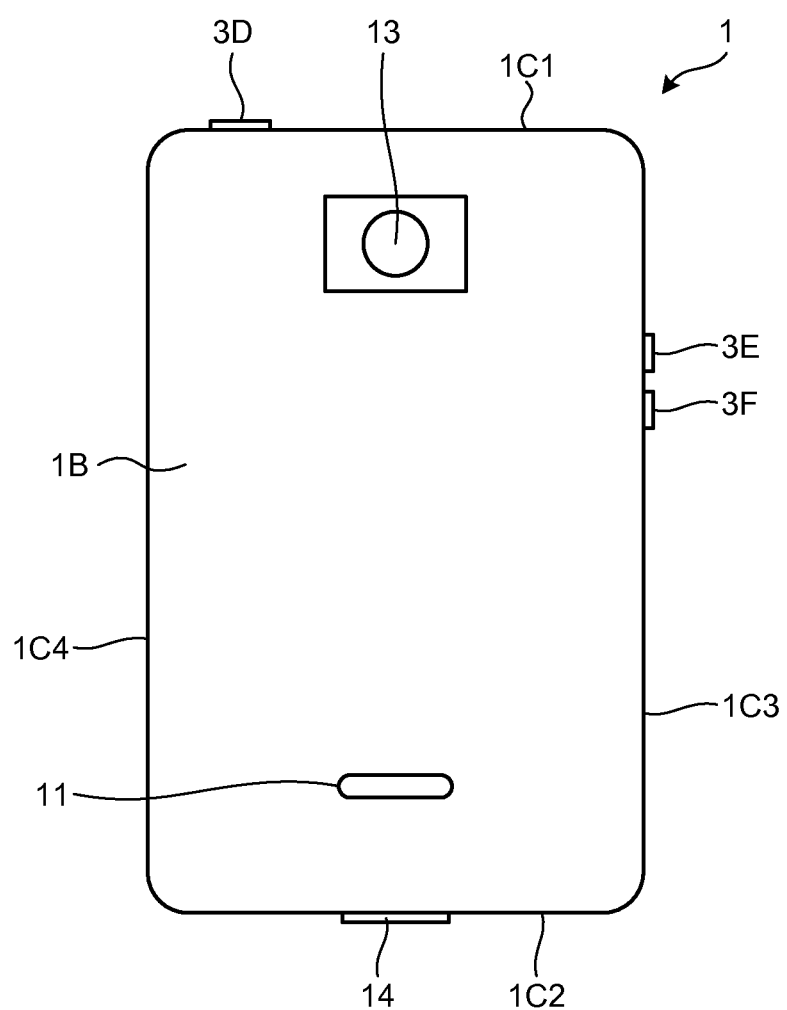
FIG. 3 is a rear view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
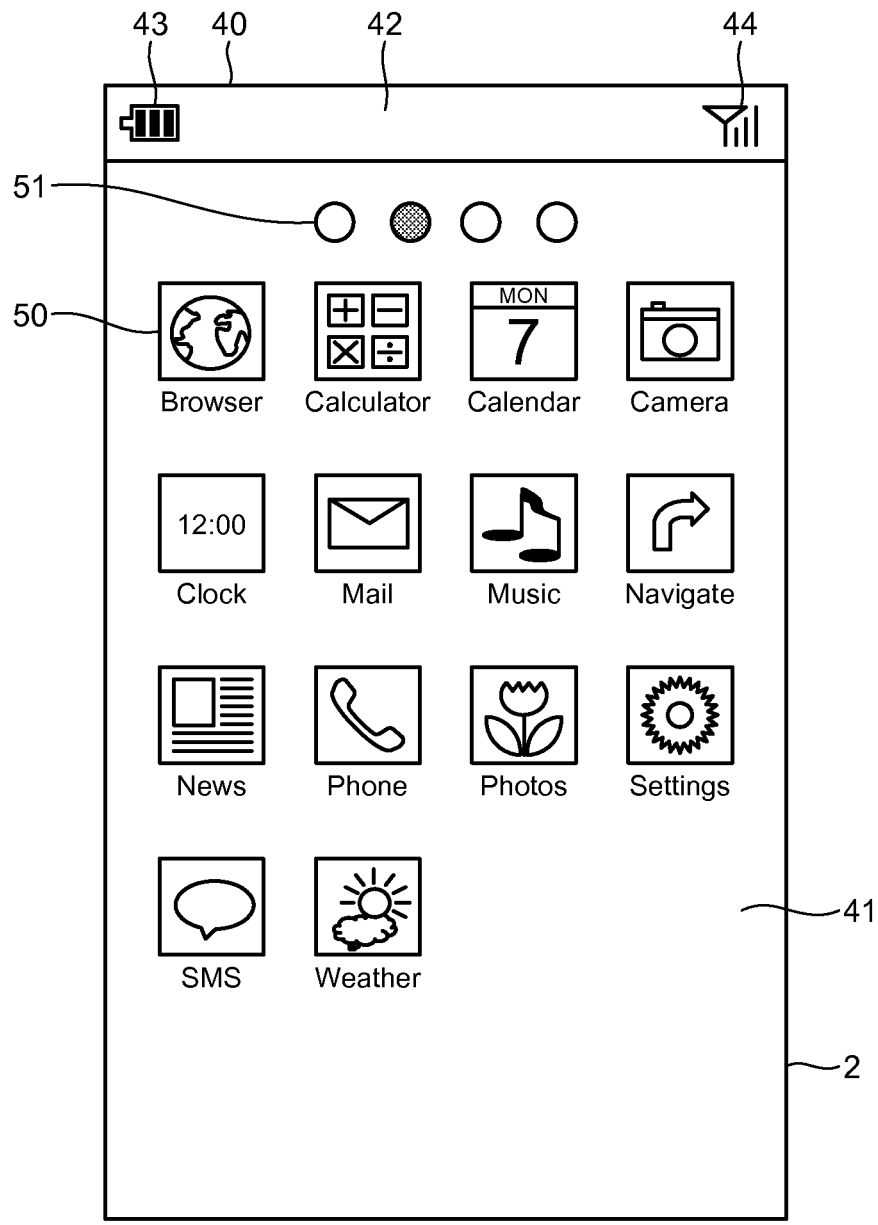
FIG. 4 is a view illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
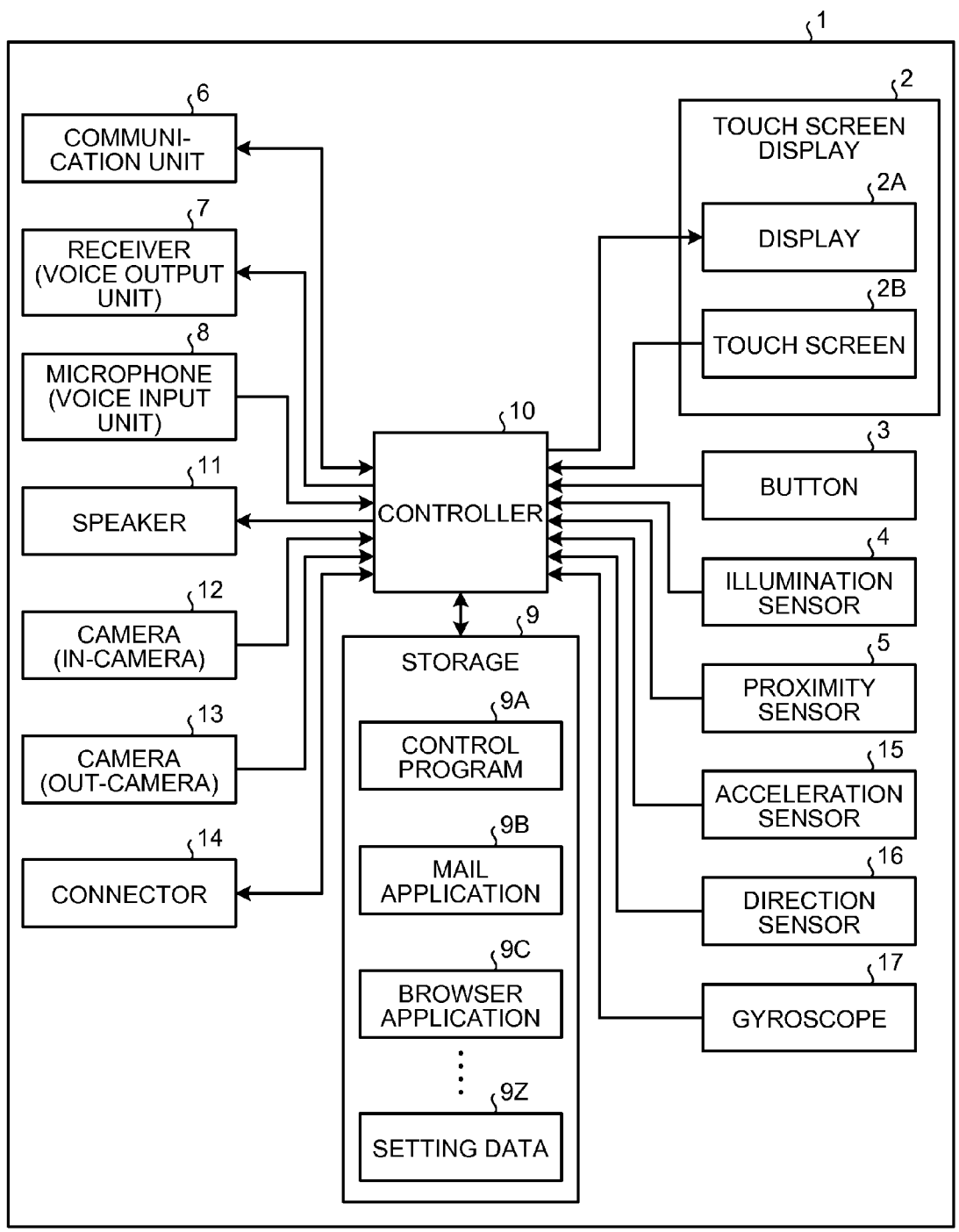
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores a control program 9A, a mail application 9B, a browser application 9C, and setting data 9Z, for example. The mail application 9B provides an e-mail function. The e-mail function enables composition, transmission, reception, display and the like of e-mail, for example. The browser application 9C provides a Web browsing function. The Web browsing function enables display of a Web page, edit of a bookmark and the like, for example. The setting data 9Z contains information related to various settings on the operation of the smartphone 1.

The control program 9A provides a function related to various pieces of control for operating the smartphone 1. The control program 9A controls, for example, the communication unit 6, the receiver 7, the microphone 8 and the like to make a phone call. Examples of the function provided by the control program 9A include, but are not limited to, the function for performing various pieces of control such as changing an orientation of the screen of the display 2A according to a detection result of the acceleration sensor 15, switching, according to the gesture detected through the touch screen 2B, between a state in which the orientation of the screen of the display 2A may be changed and a state in which the orientation of the screen is maintained, switching, according to the gesture detected through the button 3, between the state in which the orientation of the screen of the display 2A may be changed and the state in which the orientation of the screen is maintained, and the like. The function provided by the control program 9A can be used in combination with the function provided by another program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to thereby change information displayed on the display 2A according to a gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude (orientation).

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

An example of the control based on the function provided by the control program 9A is described with reference to FIGS. 6 and 7. Examples of the function provided by the control program 9A include, but are not limited to, the function to change the orientation of the screen of the display 2A according to the detection result of the acceleration sensor 15 and the function to switch, according to the gesture detected through the touch screen 2B, between the state in which the orientation of the screen of the display 2A may be changed and the state in which the orientation is maintained. Specifically, the smartphone 1 specifies an orientation of the housing 20 by the detection result of the acceleration sensor 15, and changes the orientation of the screen of the display 2A when the specified orientation of the housing 20 is different from the orientation of the screen displayed on the display 2A, based on the function provided by the control program 9A. Further, when detecting a gesture through the touch screen 2B while the orientation of the housing 20 is different from the orientation of the screen displayed on the display 2A, the smartphone 1 shifts to a screen lock state in which the orientation of the screen of the display 2A is maintained so as not to change the orientation of the screen of the display 2A, based on the function provided by the control program 9A. The orientation of the screen in the embodiment may be specified based on an orientation of the displayed character and/or image. For example, when the characters for indicating contents of the icon or the like is displayed in a normal state, an upward direction of the character is an upward direction of the screen and a downward direction of the character is a downward direction of the screen. Although there is a case in which the characters in various directions are displayed on the display 2A regardless of the orientation of the screen, in this case, a top-to-bottom direction of the screen may be specified based on the direction of a reference character.

Figure 6:
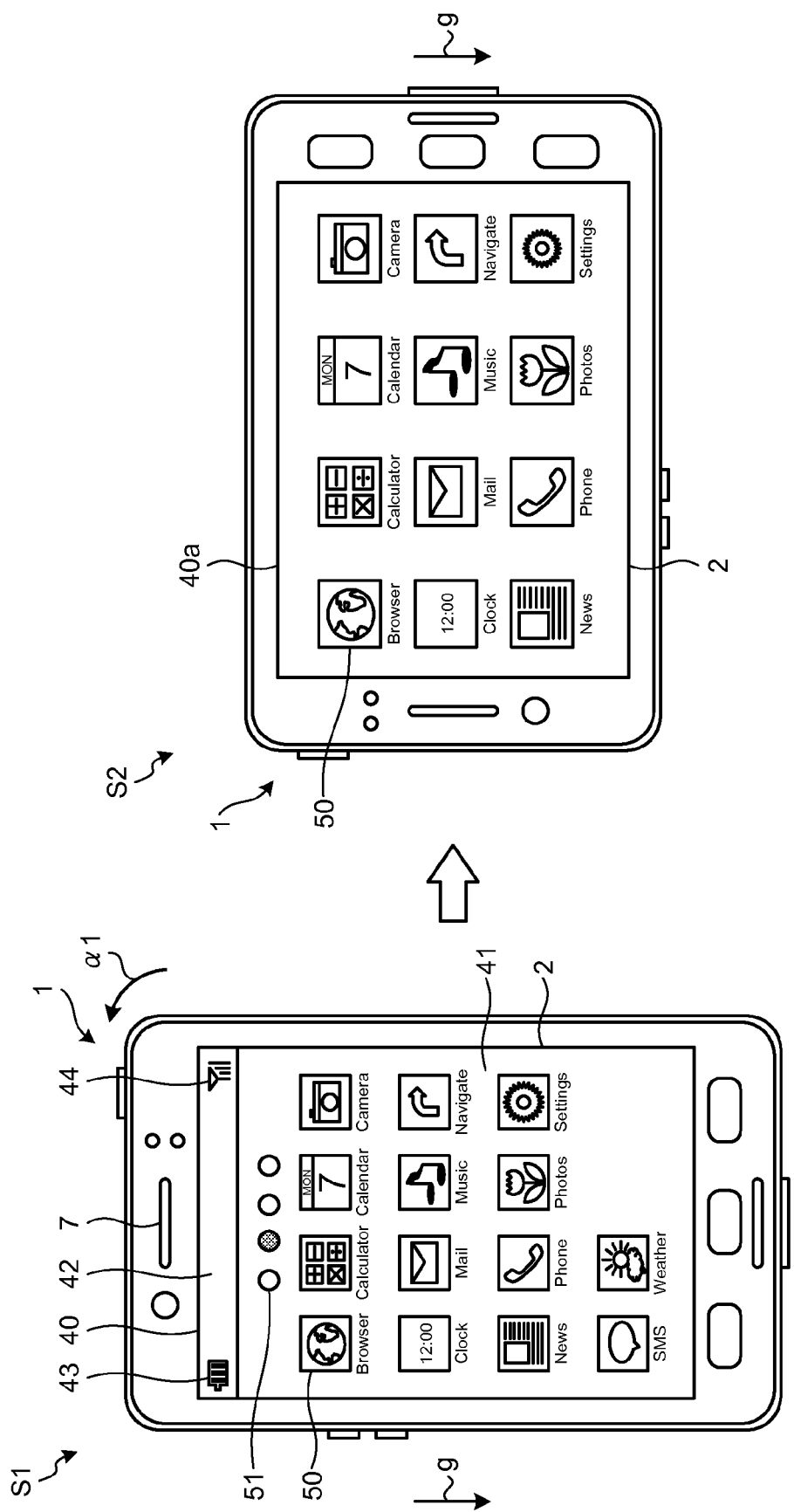
FIG. 6 is a view illustrating an example of control to change an orientation of a screen.
Figure 7:
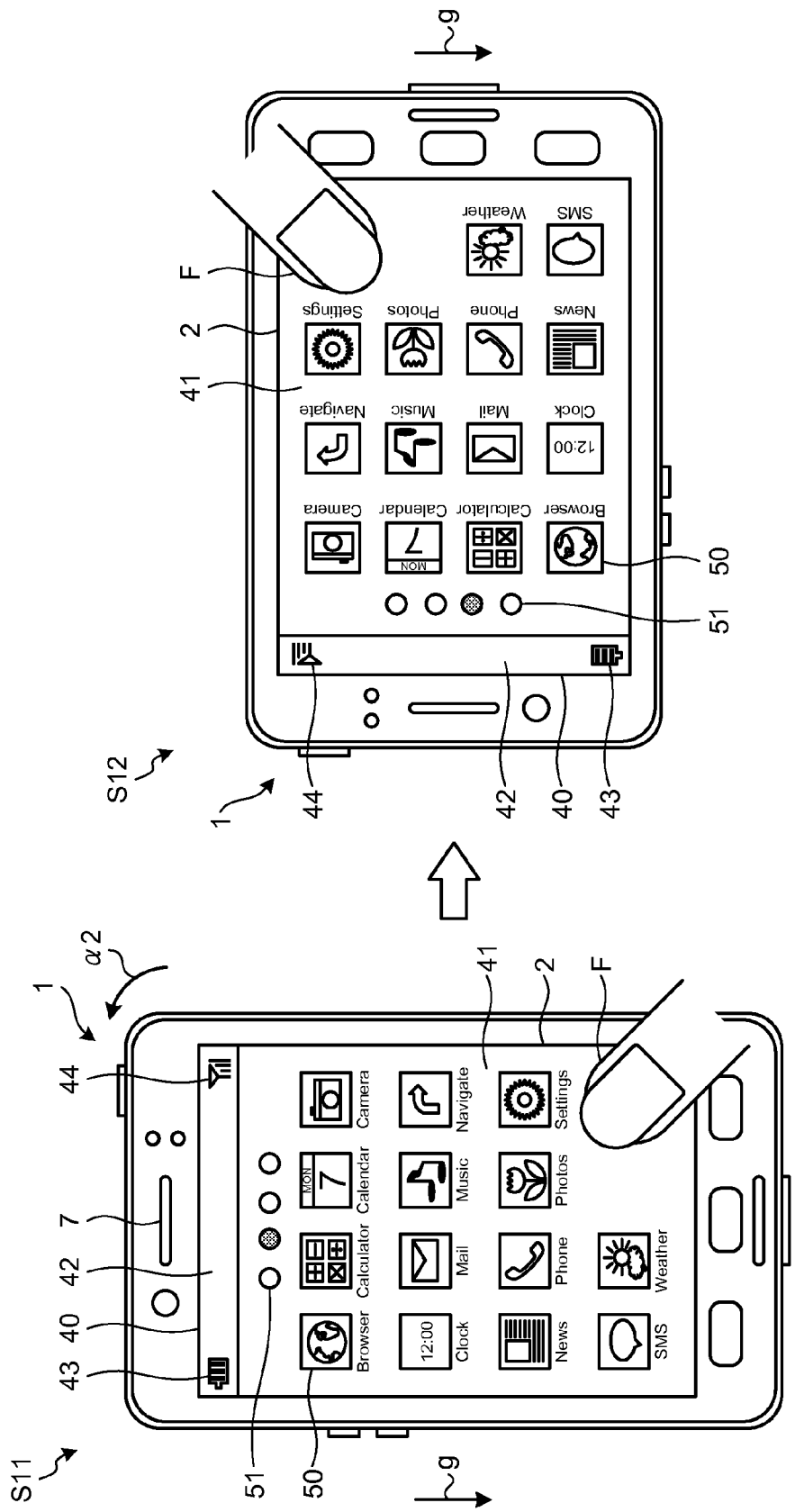
FIG. 7 is a view illustrating an example of the control to change the orientation of the screen.

A vertical direction g with respect to a surface of the touch screen display 2 is indicated by an arrow in FIGS. 6 and 7. A direction indicated by the arrow in the vertical direction g is a vertical downward direction. In FIGS. 6 and 7, a direction opposite to the direction indicated by the arrow in the vertical direction g is a vertical upward direction. In examples of the orientation of the touch screen display 2 in FIG. 8 and subsequent drawings also, the direction of the arrow in the vertical direction g is the vertical direction. Cases in which the touch screen display 2 is in an orientation in which the surface thereof incorporates the vertical direction (arrow g), that is to say, cases in which the touch screen display 2 is in an orientation in which the surface thereof is parallel to the vertical direction (arrow g) are described bellow; however, the orientation of the touch screen display 2 is not limited thereto. The smartphone 1 may be in an orientation in which the surface of the touch screen display 2 is inclined with respect to the vertical direction (arrow g).

That is to say, the smartphone 1 may be such that a section line to cut the surface of the touch screen display 2 along a plane orthogonal to the surface of the touch screen display 2 and passing through the vertical direction is inclined with respect to the vertical direction (arrow g). Even in this case, it is possible to perform a similar process by specifying upward and downward directions in the vertical direction (arrow g) on the surface of the touch screen display 2. When the surface of the touch screen display 2 is in a normal orientation (orientation orthogonal to the vertical direction, level orientation) or when an angle between the surface of the touch screen display 2 and the normal direction is small, the vertical direction on the surface of the touch screen display 2 cannot be specified, so that the smartphone 1 may maintain the orientation of the screen of the display 2. A small angle between the surface of the touch screen display 2 and the normal direction is exemplified by 20 degrees, 15 degrees and the like.

At step S1 illustrated in FIG. 6, the home screen 40 is displayed on the touch screen display 2. The smartphone 1 at step S1 is arranged in an orientation in which a long side of the housing 20 is in the vertical direction. The home screen 40 is the screen corresponding to a portrait screen in which a long side of the touch screen display 2 is in a screen top-to-bottom direction and a side on which the receiver 7 is arranged is on an upper side of the screen. At step S1, the smartphone 1 is in an orientation in which a top-to-bottom direction of the housing 20 and the screen top-to-bottom direction of the home screen 40 coincide with each other. The top-to-bottom direction of the housing 20 is the vertical direction detected through the acceleration sensor 15, in which a direction toward an upper side of the housing 20 in the vertical direction is an upward direction and a direction toward a lower side in the vertical direction is a downward direction. An orientation in which the top-to-bottom direction of the housing 20 and the screen top-to-bottom direction of the home screen 40 coincide with each other is an orientation in which the screen top-to-bottom direction of the home screen 40 is in the vertical direction. The top-to-bottom direction of the housing 20 also is a top-to-bottom direction of the smartphone 1.

The user rotates the smartphone 1, which is in an orientation illustrated at step S1, in a direction indicated by an arrow α1, a counterclockwise direction by approximately 90 degrees. That is to say, the user changes the orientation of the smartphone 1 from the orientation illustrated at step S1 to the orientation illustrated at step S2. In the embodiment, it is assumed that the smartphone 1 is rotated around a line perpendicular to the surface of the touch screen display 2 as an axis. That is to say, it is assumed that the smartphone 1 is rotated in such a manner that the surface of the touch screen display 2 before the rotation and that after the rotation are parallel to each other. In a following embodiment also, when the smartphone 1 is rotated, the smartphone 1 is rotated around the line perpendicular to the surface of the touch screen display 2 as the axis. When the smartphone 1 is rotated around the line perpendicular to the surface of the touch screen display 2 as the axis, a direction of the section line to cut the surface of the touch screen display 2 along the plane orthogonal to the surface of the touch screen display 2 and passing through the vertical direction, for example, the long side of the touch screen display 2 at step S1, can be changed. When the smartphone 1 does not rotate around the line perpendicular to the surface of the touch screen display 2 as the axis but the direction of the section line to cut the surface of the touch screen display 2 along the plane orthogonal to the surface of the touch screen display 2 and passing through the vertical direction, for example, the long side of the touch screen display 2 at step S1 changes, the smartphone 1 may execute operation different from a case of the change in the orientation of the screen.

When the user changes the orientation of the smartphone 1 from the orientation illustrated at step S1 to the orientation illustrated at step S2, the smartphone 1 detects that the housing 20 rotates by 90 degrees through the acceleration sensor 15. When the smartphone 1 detects that the housing 20 rotates by 90 degrees, the smartphone 1 changes the orientation of the screen displayed on the touch screen display 2 based on a relationship between the orientation of the housing 20 and the orientation of the screen of the touch screen display 2.

At step S2 illustrated in FIG. 6, a home screen 40a is displayed on the touch screen display 2. The smartphone 1 at step S2 is arranged in an orientation in which a short side of the housing 20 is in the vertical direction. The home screen 40a is the screen obtained by rotating the home screen 40 in the counterclockwise direction by 90 degrees. The home screen 40a is the screen corresponding to a landscape screen in which a short side of the touch screen display 2 is in the top-to-bottom direction thereof. The icon 50 is rearranged on the home screen 40a. The smartphone 1 at step S2 is such that the top-to-bottom direction of the housing 20 and the screen top-to-bottom direction of the home screen 40 coincide with each other.

When the smartphone 1 detects that the orientation of the housing 20 changes, the smartphone 1 changes the orientation of a screen between the home screens 40 and 40a displayed on the touch screen display 2, as illustrated in FIG. 6. Specifically, the orientation is changed such that the screen top-to-bottom direction of the home screens 40 and 40a displayed on the touch screen display 2 coincides with the top-to-bottom direction of the housing 20, that is to say, the vertical direction. Accordingly, the user may display the home screens 40 and 40a on the touch screen display 2 of the smartphone 1 in an orientation in which the screen top-to-bottom direction is in the vertical direction.

At step S11 illustrated in FIG. 7, the home screen 40 is displayed on the touch screen display 2. The smartphone 1 at step S11 is arranged in the orientation in which the long side of the housing 20 is in the vertical direction as at step S1. The home screen 40 is the screen corresponding to the portrait screen in which the long side of the touch screen display 2 is in the screen top-to-bottom direction and the side on which the receiver 7 is arranged is on the upper side of the screen. In the smartphone 1 at step S11, the top-to-bottom direction of the housing 20 and the screen top-to-bottom direction of the home screen 40 coincide with each other.

At step S11, a finger F of the user touches the home screen 40. In this case, the smartphone 1 detects a touch on the home screen 40 through the touch screen 2B. While maintaining a state in which the finger F touches the home screen 40, the user rotates the smartphone 1, which is in the orientation illustrated at step S11, in a direction indicated by an arrow α2, that is to say, in the counterclockwise direction by approximately 90 degrees around the line perpendicular to the surface of the touch screen display 2 as the axis. That is to say, the user maintains the state in which the finger F touches the home screen 40 and changes the orientation of the smartphone 1 from the orientation illustrated at step S11 to the orientation illustrated at step S12. In this case, the smartphone 1 detects the touch on the home screen 40 and further detects that the housing 20 rotates by 90 degrees through the acceleration sensor 15. When the smartphone 1 detects the touch on the home screen 40, the smartphone 1 enters the screen lock state in which the orientation of the screen displayed on the touch screen display 2 is not changed even when it is detected that the housing 20 rotates by 90 degrees.

At step S12 illustrated in FIG. 7, the home screen 40 is displayed on the touch screen display 2. The smartphone 1 at step S12 is arranged in the orientation in which the short side of the housing 20 is in the vertical direction. The home screen 40 is the screen corresponding to the portrait screen in which the long side of the touch screen display 2 is in the top-to-bottom direction thereof. The home screen 40 is displayed on the touch screen display 2 such that the top-to-bottom direction of the screen is in the horizontal direction. Therefore, in the smartphone 1 at step S12, the top-to-bottom direction of the housing 20 and the screen top-to-bottom direction of the home screen 40 do not coincide with each other.

When the smartphone 1 detects the touch on the home screen 40 and further detects that the orientation of the housing 20 changes, the smartphone 1 enters the screen lock state; that is to say, the smartphone 1 does not change the orientation of the home screen 40 with respect to the touch screen display 2 as illustrated in FIG. 7. Thus, the user can prevent the home screen 40 from rotating with respect to the touch screen display 2 even when the orientation of the housing 20 is changed, only by touching the touch screen display 2.

The smartphone 1 enters the screen lock state or not depending on whether the touch is detected on the home screen 40 as illustrated in FIGS. 6 and 7. Accordingly, the user can rotate the home screen 40 with respect to the touch screen display 2 or not depending on whether the user touches the touch screen display 2 when the orientation of the smartphone 1 is changed. Consequently, the user can select to rotate the home screen 40 with respect to the touch screen display 2 or not by simple operation and can display the screen in a desired orientation.

The smartphone 1 illustrated in FIGS. 6 and 7 is rotated from a state in which the long side of the housing 20 is parallel to the vertical direction g to a state in which the short side of the housing 20 is parallel to the vertical direction g on the surface of the touch screen display 2, and vice versa. Although the smartphone 1 illustrated in FIGS. 6 and 7 is of a case in which the receiver 7 is arranged on the upper side in the vertical direction g, a case in which the microphone 8 is arranged on the upper side in the vertical direction g also is similar.

In the smartphone 1 illustrated in FIG. 6, when it is changed from the state in which the long side of the housing 20 is in the vertical direction g to the state in which the short side of the housing 20 is in the vertical direction g on the surface of the touch screen display 2, the orientation of the home screen is changed based on the orientation of the housing 20. There are various criteria to change the orientation of the home screen based on the orientation of the housing 20. For example, as illustrated at step S1 of the smartphone 1, it is possible to configure such that, when the housing 20 is rotated from the state in which the long side thereof is in the vertical direction as a reference state toward the state in which the short side thereof is in the vertical direction by an angle larger than 45 degrees, the orientation of the home screen is changed. That is to say, the smartphone 1 may change the orientation of the home screen such that the side, of which angle from the vertical direction is the smallest, out of the long side and the short side of the housing 20 is in the screen top-to-bottom direction. The smartphone 1 may change the orientation of the home screen based on the orientation of the housing 20 according to a criterion that an angle between the top-to-bottom direction of the screen and the top-to-bottom direction of the housing 20 (vertical direction g) becomes larger than 60 degrees.

Although the smartphone 1 of the above-described example displays the home screen on the touch screen display 2, the similar process may also be performed when a screen other than the home screen is displayed.

When the smartphone 1 detects the touch on the home screen 40 and enters the screen lock state, the smartphone 1 may maintain the screen lock state until a set release condition is satisfied. Each of FIGS. 8 to 11 is a view illustrating an example of the control to change the orientation of the screen.

Figure 8:
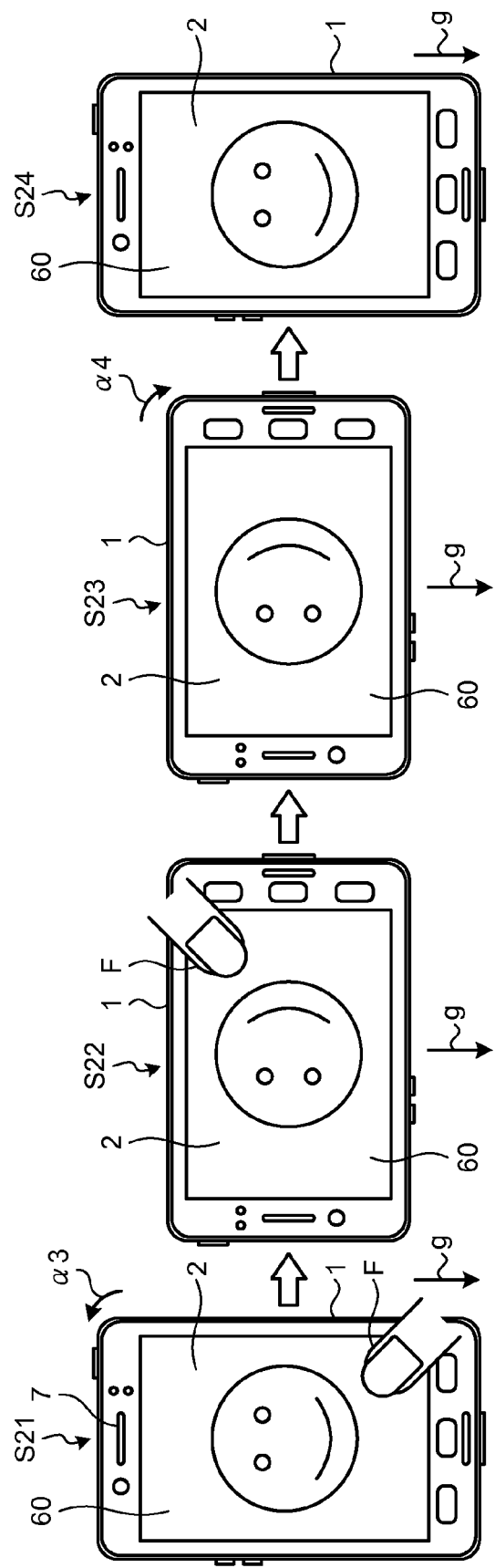
FIG. 8 is a view illustrating an example of the control to change the orientation of the screen.

At step S21 illustrated in FIG. 8, a screen 60 is displayed on the touch screen display 2. The smartphone 1 at step S21 is arranged in the orientation in which the long side of the housing 20 is parallel to the vertical direction g. The screen 60 is the screen corresponding to the portrait screen in which the long side of the touch screen display 2 is in the screen top-to-bottom direction and the side on which the receiver 7 is arranged is on the upper side of the screen. In the smartphone 1 at step S21, the top-to-bottom direction of the housing 20 and the screen top-to-bottom direction of the screen 60 coincide with each other. The screen 60 is an image of a face mark.

At step S21, the finger F of the user touches the screen 60. In this case, the smartphone 1 detects a touch on the screen 60 through the touch screen 2B. The user maintains a state in which the finger F touches the screen 60 and rotates the smartphone 1, which is in the orientation illustrated at step S21, in a direction indicated by an arrow α3, that is to say, in the counterclockwise direction by approximately 90 degrees. That is to say, the user maintains the state in which the finger F touches the screen 60 and changes the orientation of the smartphone 1 from the orientation illustrated at step S21 to the orientation illustrated at step S22 around the line perpendicular to the surface of the touch screen display 2 as the axis. In this case, the smartphone 1 detects the touch on the screen 60 and further detects that the housing 20 rotates by 90 degrees through the acceleration sensor 15. When the smartphone 1 detects the touch on the screen 60, the smartphone 1 enters the screen lock state in which the orientation of the screen displayed on the touch screen display 2 is not changed even when it is detected that the housing 20 rotates by 90 degrees.

At step S22 illustrated in FIG. 8, the screen 60 is displayed on the touch screen display 2. The smartphone 1 at step S22 is arranged in the orientation in which the short side of the housing 20 is in the vertical direction. The screen 60 is the screen corresponding to the portrait screen in which the long side of the touch screen display 2 is in the top-to-bottom direction thereof as described above. The screen 60 is displayed on the touch screen display 2 in the orientation in which the top-to-bottom direction of the screen is in the horizontal direction.

At step S23 illustrated in FIG. 8, the screen 60 is displayed on the touch screen display 2. In the smartphone 1 at step S23, the finger F is released from the screen 60. In this case, the smartphone 1 detects that the finger F is released. The smartphone 1 maintains the screen lock state even after detecting that the finger F is released and displays the screen 60 on the touch screen display 2 in the orientation in which the top-to-bottom direction of the screen is in the horizontal direction.

The user rotates the smartphone 1, which is in an orientation illustrated at step S23, in a direction indicated by an arrow α4, that is to say, in a clockwise direction by approximately 90 degrees. That is to say, the user changes the orientation of the smartphone 1 from the orientation illustrated at step S23 to the orientation illustrated at step S24 around the line perpendicular to the surface of the touch screen display 2 as the axis. In this case, the smartphone 1 detects that the housing 20 rotates by 90 degrees through the acceleration sensor 15. In the screen lock state, the smartphone 1 does not change the orientation of the screen displayed on the touch screen display 2 even when it is detected that the housing 20 rotate by 90 degrees.

Further, in the screen lock state, the smartphone 1 does not change the orientation of the screen displayed on the touch screen display 2 even when the orientation is changed from the orientation illustrated at step S24 to the orientation illustrated at step S23.

Figure 9:
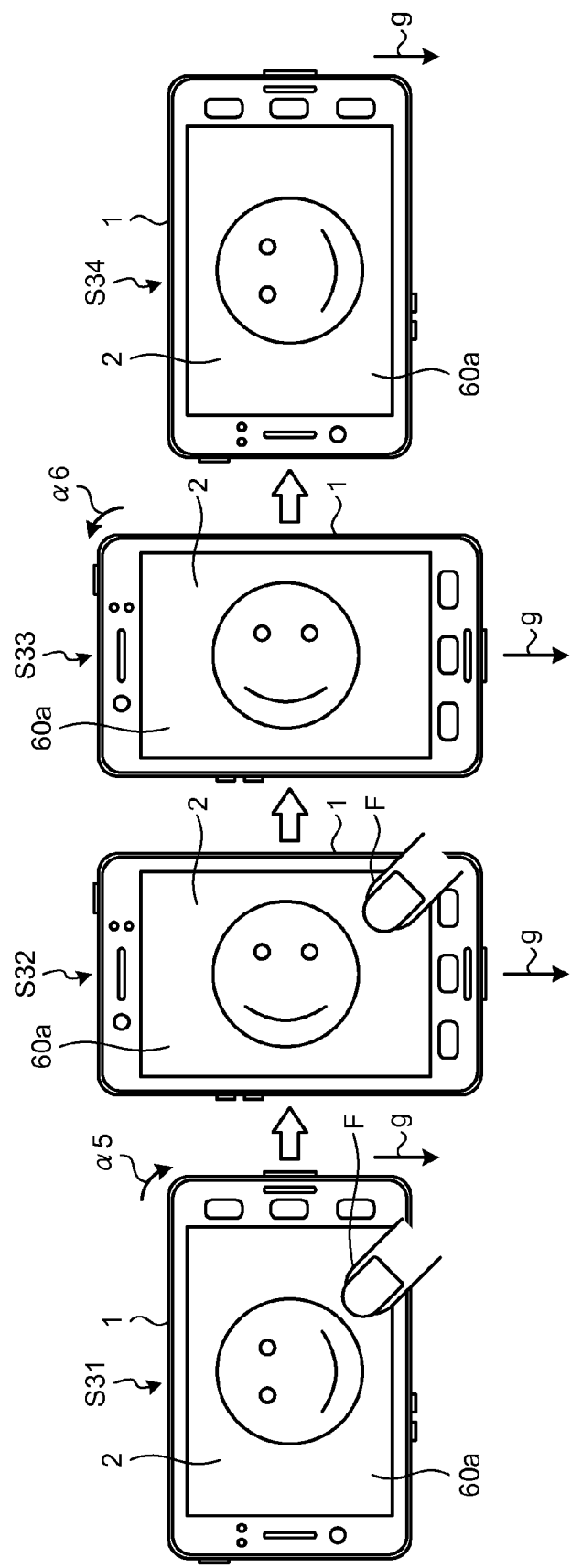
FIG. 9 is a view illustrating an example of the control to change the orientation of the screen.

At step S31 illustrated in FIG. 9, a screen 60a is displayed on the touch screen display 2. The smartphone 1 at step S31 is arranged in the orientation in which the short side of the housing 20 is parallel to the vertical direction g. The screen 60a is the screen corresponding to the landscape screen in which the short side of the touch screen display 2 is in the screen top-to-bottom direction. In the smartphone at step S31, the top-to-bottom direction of the housing 20 (vertical direction g) and the screen top-to-bottom direction of the screen 60a coincide with each other. The screen 60a is the image of the face mark. The screen 60a is the image obtained by rotating the image of the face by 90 degrees with respect to the screen 60.

At step S31, the finger F of the user touches the screen 60a. In this case, the smartphone 1 detects the touch on the screen 60a through the touch screen 2B. The user maintains a state in which the finger F touches the screen 60a and rotates the smartphone 1, which is in the orientation illustrated at step S31, in a direction indicated by an arrow α5, that is to say, in the clockwise direction by approximately 90 degrees. That is to say, the user maintains the state in which the finger F touches the screen 60a and changes the orientation of the smartphone 1 from the orientation illustrated at step S31 to the orientation illustrated at step S32 around the line perpendicular to the surface of the touch screen display 2 as the axis. In this case, the smartphone 1 detects the touch on the screen 60a and further detects that the housing 20 rotates by 90 degrees through the acceleration sensor 15. When the smartphone 1 detects the touch on the screen 60a, the smartphone 1 enters the screen lock state in which the smartphone 1 does not change the orientation of the screen displayed on the touch screen display 2 even when it is detected that the housing 20 rotates by 90 degrees.

At step S32 illustrated in FIG. 9, the screen 60a is displayed on the touch screen display 2. The smartphone 1 at step S32 is arranged in the orientation in which the long side of the housing 20 is in the vertical direction. The screen 60a is the screen corresponding to the landscape screen in which the short side of the touch screen display 2 is in the top-to-bottom direction thereof as described above. The screen 60a is displayed on the touch screen display 2 in the orientation in which the top-to-bottom direction of the screen is in the horizontal direction.

At step S33 illustrated in FIG. 9, the screen 60a is displayed on the touch screen display 2. In the smartphone 1 at step S33, the finger F is released from the screen 60a. In this case, the smartphone 1 detects that the finger F is released. The smartphone 1 maintains the screen lock state even after detecting that the finger F is released and displays the screen 60a on the touch screen display 2 in the orientation in which the top-to-bottom direction of the screen is in the horizontal direction.

The user rotates the smartphone 1, which is in an orientation illustrated at step S33, in a direction indicated by an arrow α6, that is to say, in the counterclockwise direction by approximately 90 degrees. That is to say, the user changes the orientation of the smartphone 1 from the orientation illustrated at step S33 to the orientation illustrated at step S34 around the line perpendicular to the surface of the touch screen display 2 as the axis. In this case, the smartphone 1 detects that the housing 20 rotates by 90 degrees through the acceleration sensor 15. In the screen lock state, the smartphone 1 does not change the orientation of the screen displayed on the touch screen display 2 even when it is detected that the housing 20 rotates by 90 degrees.

Further, In the screen lock state, the smartphone 1 does not change the orientation of the screen displayed on the touch screen display 2 even when the orientation is changed from the orientation illustrated at step S34 to the orientation illustrated at step S33.

As illustrated in FIGS. 8 and 9, in the screen lock state, the smartphone 1 prevents the screen from rotating even when it is in a state in which the touch screen display 2 is no longer touched, so that the orientation of the screen can be fixed in an orientation desired by the user.

Examples of release of the screen lock state are described with reference to FIGS. 10 and 11. At step S41 illustrated in FIG. 10, the screen 60 is displayed on the touch screen display 2. The smartphone 1 at step S41 is in the screen lock state and is arranged in the orientation in which the short side of the housing 20 is parallel to the vertical direction g. The screen 60 is the screen corresponding to the portrait screen in which the long side of the touch screen display 2 is in the screen top-to-bottom direction. In the smartphone 1 at step S41, the top-to-bottom direction of the housing 20 (vertical direction g) and the screen top-to-bottom direction of the screen 60 do not coincide with each other.

At step S41, the finger F of the user touches the screen 60. In this case, the smartphone 1 detects a touch on the screen 60 through the touch screen 2B. The user maintains the state in which the finger F touches the screen 60 and rotates the smartphone 1, which is in the orientation illustrated at step S41, in a direction indicated by an arrow α7, that is to say, in the clockwise direction by approximately 90 degrees. That is to say, the user maintains the state in which the finger F touches the screen 60 and changes the orientation of the smartphone 1 from the orientation illustrated at step S41 to the orientation illustrated at step S42 around the line perpendicular to the surface of the touch screen display 2 as the axis. In this case, the smartphone 1 detects the touch on the screen 60 and further detects that the housing 20 rotates by 90 degrees through the acceleration sensor 15. Since the smartphone 1 is in the screen lock state, the smartphone 1 does not change the orientation of the screen displayed on the touch screen display 2 even when it is detected that the housing 20 rotates by 90 degrees.

Figure 10:
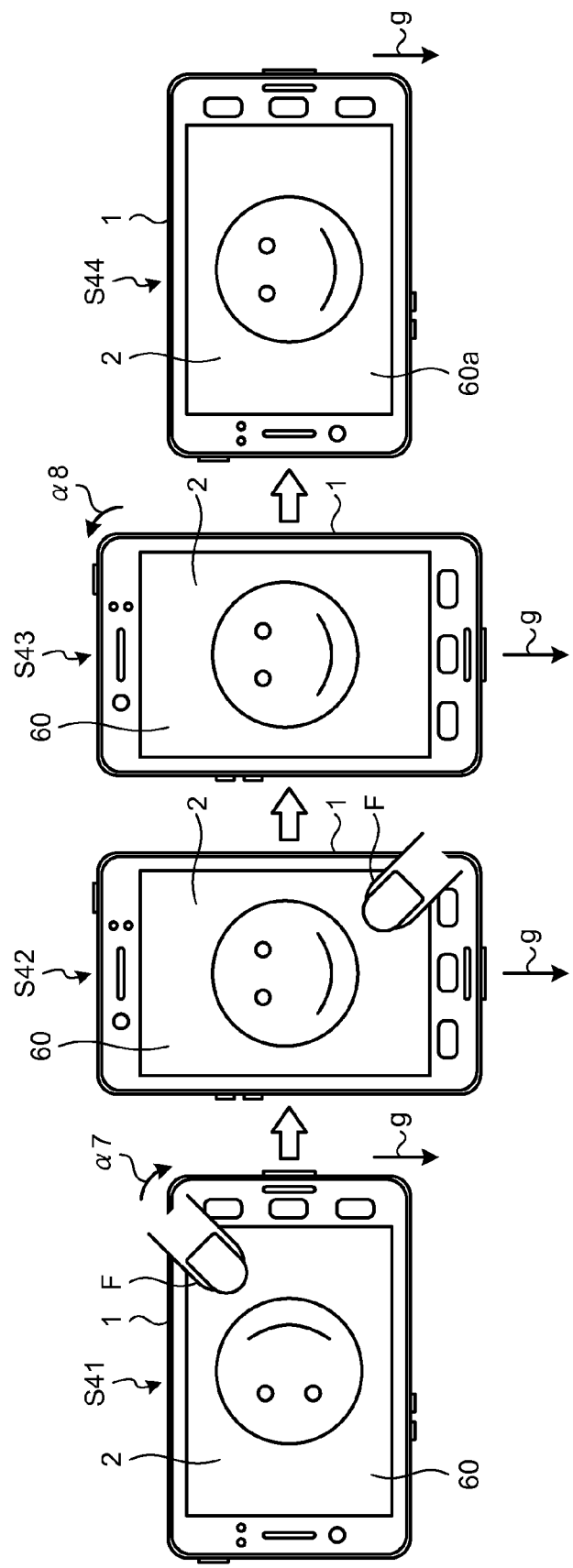
FIG. 10 is a view illustrating an example of the control to change the orientation of the screen.

At step S42 illustrated in FIG. 10, the screen 60 is displayed on the touch screen display 2. The smartphone 1 at step S42 is arranged in the orientation in which the long side of the housing 20 is in the vertical direction. In the smartphone 1 at step S42, the top-to-bottom direction of the housing 20 and the screen top-to-bottom direction of the screen 60 coincide with each other. In the screen lock state, the smartphone 1 releases the screen lock state when the smartphone 1 is detecting a touch on the screen 60 and the top-to-bottom direction of the housing 20 and the screen top-to-bottom direction of the screen 60 coincide with each other.

At step S43 illustrated in FIG. 10, the screen 60 is displayed on the touch screen display 2. In the smartphone 1 at step S43, the finger F is released from the screen 60. In this case, the smartphone 1 detects that the finger F is released.

The user rotates the smartphone 1, which is in an orientation illustrated at step S43, in a direction indicated by an arrow α8, that is to say, in the counterclockwise direction by approximately 90 degrees. That is to say, the user changes the orientation of the smartphone 1 from the orientation illustrated at step S43 to the orientation illustrated at step S44 around the line perpendicular to the surface of the touch screen display 2 as the axis. In this case, the smartphone 1 detects that the housing 20 rotates by 90 degrees through the acceleration sensor 15. When the smartphone 1 is not in the screen lock state, the smartphone 1 rotates the orientation of the screen displayed on the touch screen display 2 along with the rotation of the housing 20 when it is detected that the housing 20 rotates by 90 degrees.

At step S44 illustrated in FIG. 10, the screen 60a is displayed on the touch screen display 2. The smartphone 1 at step S44 is arranged in the orientation in which the short side of the housing 20 is in the vertical direction. The screen 60a is the screen corresponding to the landscape screen in which the short side of the touch screen display 2 is in the screen top-to-bottom direction. In the smartphone 1 at step S44, the top-to-bottom direction of the housing 20 and the screen top-to-bottom direction of the screen 60a coincide with each other.

Further, when the smartphone 1 is not in the screen lock state, the orientation of the screen displayed on the touch screen display 2 is also changed when the orientation is changed from the orientation illustrated at step S44 to the orientation illustrated at step S43.

Figure 11:
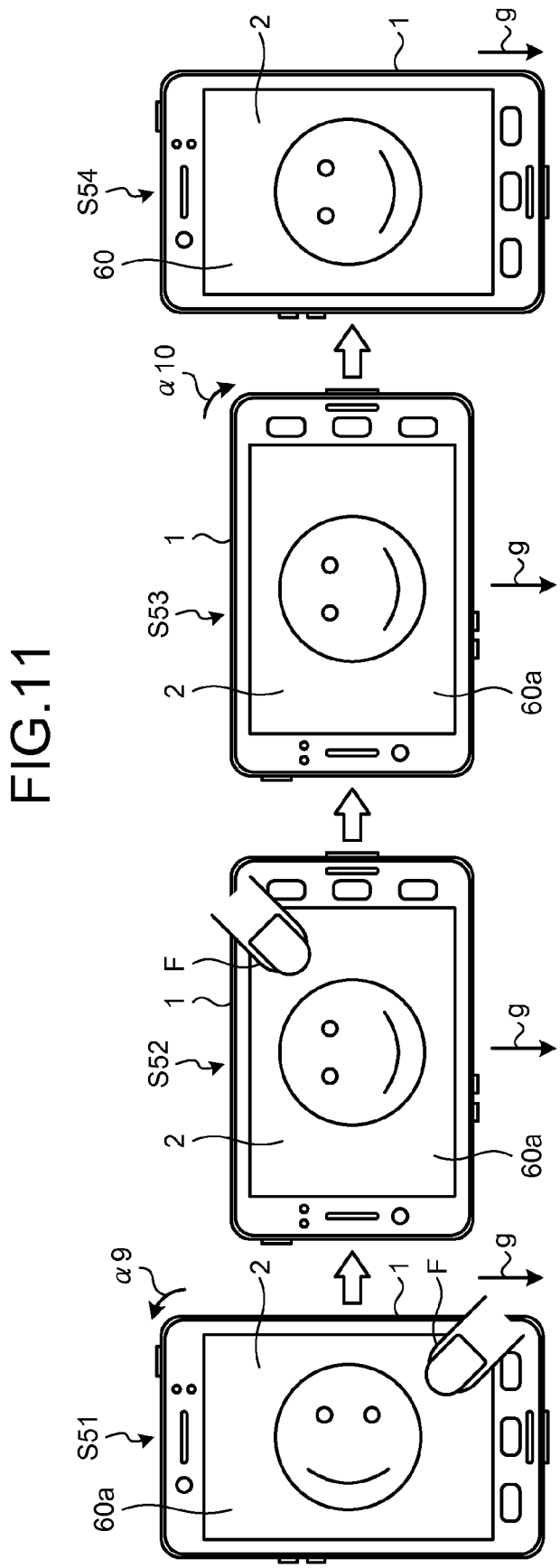
FIG. 11 is a view illustrating an example of the control to change the orientation of the screen.

At step S51 illustrated in FIG. 11, the screen 60a is displayed on the touch screen display 2. The smartphone 1 at step S51 is in the screen lock state and is arranged in the orientation in which the long side of the housing 20 is parallel to the vertical direction g. The screen 60a is the screen corresponding to the landscape screen in which the short side of the touch screen display 2 is in the screen top-to-bottom direction. In the smartphone 1 at step S51, the top-to-bottom direction of the housing 20 (vertical direction) and the screen top-to-bottom direction of the screen 60a do not coincide with each other.

At step S51, the finger F of the user touches the screen 60a. In this case, the smartphone 1 detects a touch on the screen 60a through the touch screen 2B. The user maintains the state in which the finger F touches the screen 60a and rotates the smartphone 1, which is in the orientation illustrated at step S51, in a direction indicated by an arrow α9, that is to say, in the counterclockwise direction by approximately 90 degrees. That is to say, the user maintains the state in which the finger F touches the screen 60a and changes the orientation of the smartphone 1 from the orientation illustrated at step S51 to the orientation illustrated at step S52 around the line perpendicular to the surface of the touch screen display 2 as the axis. In this case, the smartphone 1 detects the touch on the screen 60a and further detects that the housing 20 rotates by 90 degrees through the acceleration sensor 15. Since the smartphone 1 is in the screen lock state, the smartphone 1 does not change the orientation of the screen displayed on the touch screen display 2 even when it is detected that the housing 20 rotates by 90 degrees.

At step S52 illustrated in FIG. 11, the screen 60a is displayed on the touch screen display 2. The smartphone 1 at step S52 is arranged in the orientation in which the short side of the housing 20 is in the vertical direction. In the smartphone 1 at step S52, the top-to-bottom direction of the housing 20 and the screen top-to-bottom direction of the screen 60a coincide with each other. In the screen lock state, the smartphone 1 releases the screen lock state when the smartphone 1 is detecting a touch on the screen 60a and the top-to-bottom direction of the housing 20 and the screen top-to-bottom direction of the screen 60a coincide with each other.

At step S53 illustrated in FIG. 11, the screen 60a is displayed on the touch screen display 2. In the smartphone 1 at step S53, the finger F is released from the screen 60a. In this case, the smartphone 1 detects that the finger F is released.

The user rotates the smartphone 1, which is in an orientation illustrated at step S53, in a direction indicated by an arrow α10, that is to say, in the clockwise direction by approximately 90 degrees. That is to say, the user changes the orientation of the smartphone 1 from the orientation illustrated at step S53 to the orientation illustrated at step S54 around the line perpendicular to the surface of the touch screen display 2 as the axis. In this case, the smartphone 1 detects that the housing 20 rotates by 90 degrees through the acceleration sensor 15. When the smartphone 1 is not in the screen lock state, the smartphone 1 rotates the orientation of the screen displayed on the touch screen display 2 along with the rotation of the housing 20 when it is detected that the housing 20 rotates by 90 degrees.

At step S54 illustrated in FIG. 11, the screen 60 is displayed on the touch screen display 2. The smartphone 1 at step S54 is arranged in the orientation in which the long side of the housing 20 is parallel to the vertical direction g. The screen 60 is the screen corresponding to the portrait screen in which the long side of the touch screen display 2 is in the screen top-to-bottom direction. In the smartphone 1 at step S54, the top-to-bottom direction of the housing 20 and the screen top-to-bottom direction of the screen 60 coincide with each other.

Further, when the smartphone 1 is not in the screen lock state, the orientation of the screen displayed on the touch screen display 2 is also changed when the orientation is changed from the orientation illustrated at step S54 to the orientation illustrated at step S53.

The smartphone 1 illustrated in FIGS. 10 and 11 releases the screen lock state when the top-to-bottom direction of the housing 20 and the screen top-to-bottom direction of the screen 60 coincide with each other in the state in which a touch on the screen is detected. Thus, an operation to release the screen lock state is set, so that the user can release the lock state at a desired point in time.

In the smartphone 1 illustrated in FIGS. 10 and 11, is the operation to release the screen lock state is an operation to allow the top-to-bottom direction of the housing 20 and the screen top-to-bottom direction of the screen 60 to coincide with each other in the state in which the touch on the screen is detected; however the releasing of the screen lock state is not limited thereto. For example, the smartphone 1 may release the screen lock state when a threshold time has elapsed since the screen lock state is set. The smartphone 1 may set the operation to allow the top-to-bottom direction of the housing 20 (vertical direction g) and the screen top-to-bottom direction of the screen 60 to coincide with each other as the operation to release the screen lock state regardless of the touch on the screen. The smartphone 1 may also release the screen lock state when the smartphone 1 shifts to a power-saving mode or when the smartphone 1 displays a screen to be executed by another application in place of a currently displayed screen.

The smartphone 1 may set a gesture other than the touch gesture as the gesture to maintain the orientation of the screen displayed on the display 2A, that is to say, to shift to the screen lock state. The smartphone 1 may set the gesture such as the flick, pinch in, and pinch out as the gesture to change the orientation of the home screen.

Figure 12:
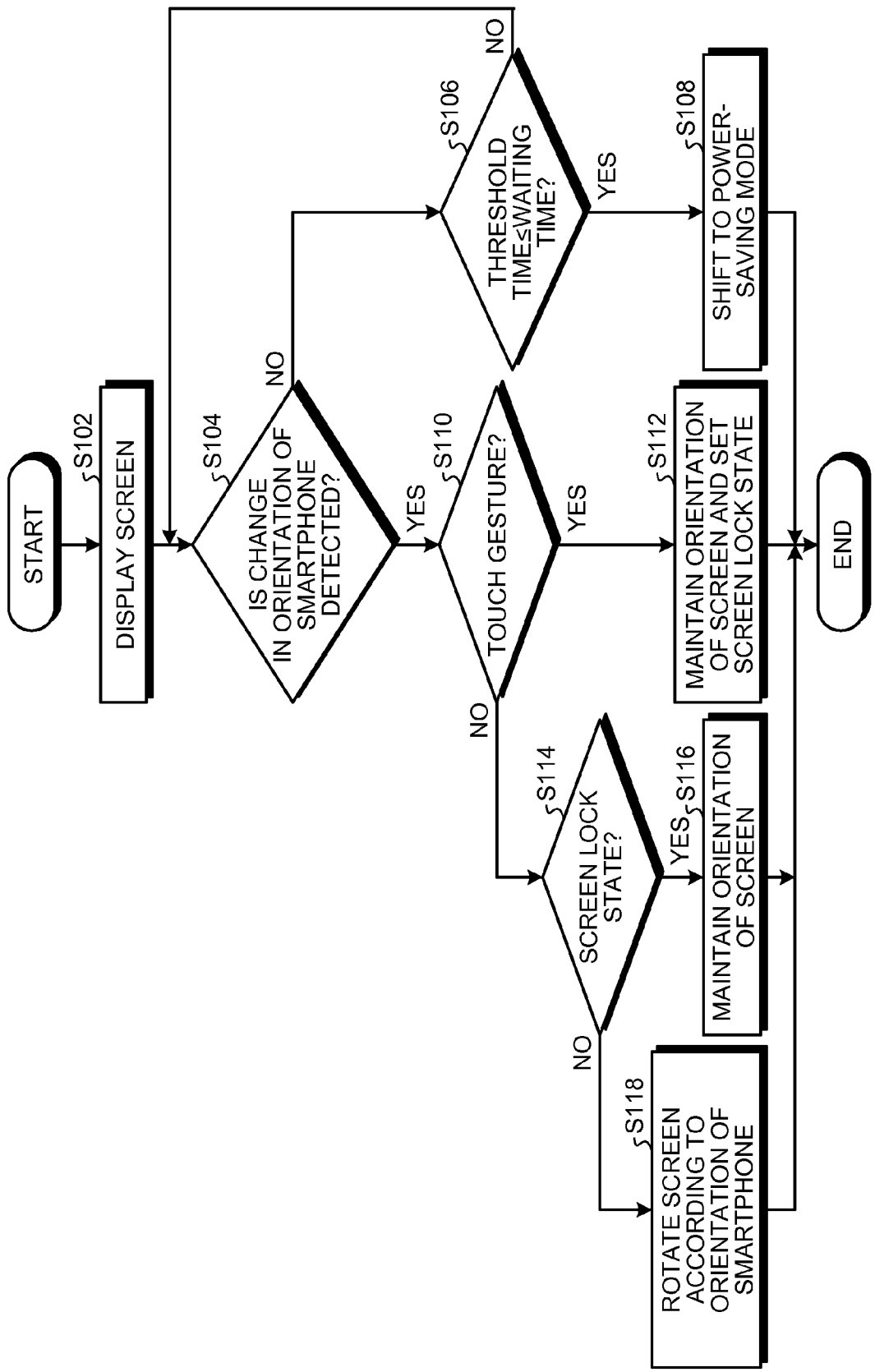
FIG. 12 is a flowchart illustrating a procedure of the control to change the orientation of the screen.
Figure 13:
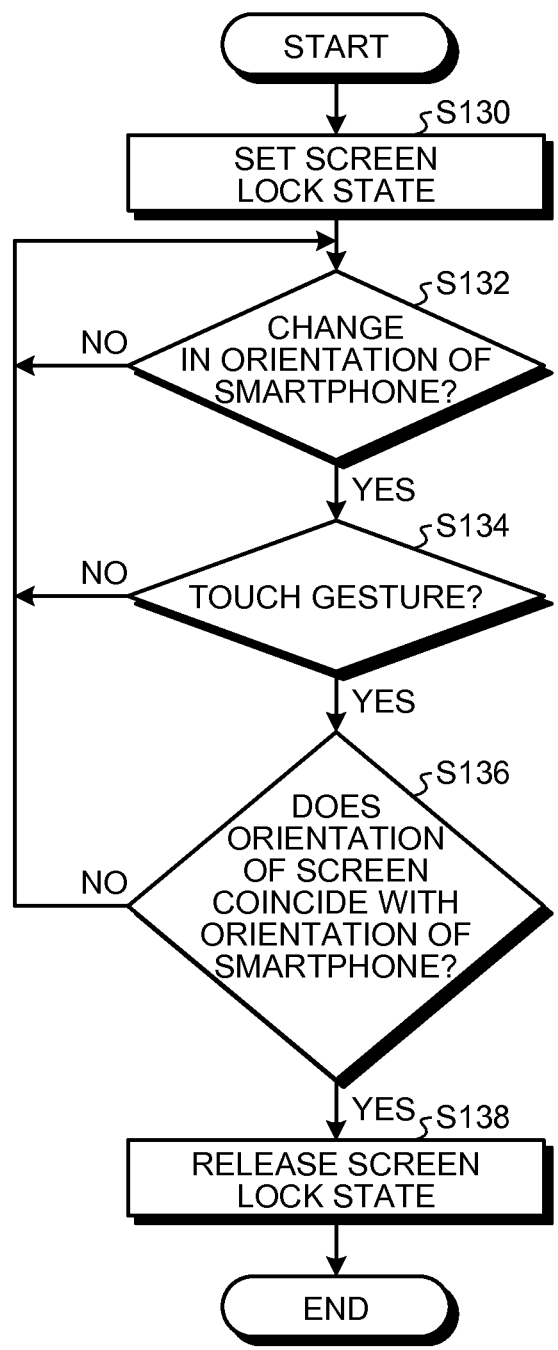
FIG. 13 is a flowchart illustrating the procedure of the control to change the orientation of the screen.

Examples of a procedure of the control based on the function provided by the control program 9A is described with reference to FIGS. 12 and 13. FIGS. 12 and 13 illustrate the procedure of the control to change the orientation of the screen according to an instruction of the user. The controller 10 executes the control program 9A to realize the procedures illustrated in FIGS. 12 and 13. The procedures illustrated in FIGS. 12 and 13 are repeatedly executed while the screen is displayed on the display 2A. The controller 10 may execute another procedure for the control related to the screen in parallel with the procedures illustrated in FIGS. 12 and 13. The procedure illustrated in FIGS. 12 and 13 can be applied to any cases in which various screen are displayed on the display 2A. For example, the cases include a case in which the above-described home screens 40 and 40a or screens 60 and 60a are displayed.

The controller 10 displays the screen on the touch screen display 2 at step S102. When the screen is displayed at step S102, then at step S104, controller 10 detects the change in the orientation of the smartphone 1. That is to say, the controller 10 detects, based on the detection result of the acceleration sensor 15, whether the orientation of the smartphone 1 has been changed, that is to say, whether the orientation of the housing 20 has been changed. When the orientation of the housing 20 has been changed by an angle, which is a criterion to change the orientation of the screen, the smartphone 1 determines that the orientation of the smartphone 1 has been changed.

When it is determined that the orientation has not been changed at step S104 (No at step S104), then at step S106, the controller 10 determines whether waiting time is satisfied. The controller 10 determines whether the waiting time, which is the time elapsed from the end of the last operation, is equal to or longer than a predetermined threshold time.

When it is determined that the waiting time is shorter than the threshold at step S106, that is to say, that threshold time>waiting time is satisfied (No at step S106), the controller 10 proceeds to step S104 and determines again whether the orientation of the smartphone has been changed. When it is determined that the waiting time is equal to or longer than the threshold at step S106 (Yes at step S106), then at step S108, the controller 10 shifts to the power-saving mode and finishes the present procedure. That is to say, the controller 10 turns off the touch screen display 2 so as not to display the lock screen and finishes the present procedure.

When it is determined that the orientation of the smartphone has been changed at step S104 (Yes at step S104), then at step S110, the controller 10 determines whether a touch gesture has been detected. That is to say, the controller 10 determines whether the touch on the screen has been detected through the touch screen display 2. When it is determined that the touch gesture has been detected at step S110 (Yes at step S110), then at step S112, the controller 10 maintains the orientation of the screen and sets the screen lock state. That is to say, without changing the orientation of the screen, the controller 10 shifts to the screen lock state in which the screen is not rotated regardless of the orientation of the smartphone 1 (housing 20) and finishes the present procedure.

When it is determined that the touch gesture has not been detected at step S110 (No at step S110), then at step S114, the controller 10 determines whether it is in the screen lock state. When it is determined that it is in the screen lock state at step S114 (Yes at step S114), then at step S116, the controller 10 maintains the orientation of the screen. That is to say, the controller 10 maintains the orientation of the screen with respect to the touch screen display 2 even when the change in the orientation of the smartphone 1 is detected. When the process at step S116 is done, the controller 10 finishes the present procedure.

When it is determined that it is not in the screen lock state at step S114 (No at step S114), then at step S118, the controller 10 rotates the screen according to the orientation of the smartphone. That is to say, the controller 10 changes the orientation of the screen displayed on the touch screen display 2 to the orientation which coincides with the orientation of the housing 20. When the process at step S118 is done, the controller 10 finishes the present procedure. When the process at steps S112, S116, or S118 is done, the controller 10 may execute again the process at step S104 and subsequent steps. That is to say, the controller 10 may repeatedly execute the process in FIG. 12 until shifting to the power-saving mode.

A process to release the screen lock state is described with reference to FIG. 13. The process illustrated in FIG. 13 may be performed in parallel with the process illustrated in FIG. 12. The controller 10 sets the screen lock state at step S130. That is to say, the process at step S130 is a part of the process at step S112. When the controller 10 sets the screen lock state at step S130, the controller 10 determines whether the orientation of the smartphone has been changed at step S132.

When it is determined that the orientation of the smartphone has not been changed at step S132 (No at step S132), the controller 10 proceeds to step S132. When it is determined that the orientation of the smartphone has been changed at step S132 (Yes at step S132), then at step S134, the controller 10 determines whether the touch gesture has been detected. When it is determined that the touch gesture has not been detected at step S134 (No at step S134), the controller 10 proceeds to step S132. When it is determined that the touch gesture has been detected at step S134 (Yes at S134), then at step S136, the controller 10 determines whether the orientation of the screen coincides with the orientation of the smartphone. When it is determined that the orientation of the screen does not coincide with the orientation of the smartphone at step S136 (No at step S136), that is to say, that the orientation of the screen is different from the orientation of the smartphone, the controller 10 proceeds to step S132. When it is determined that the orientation of the screen coincides with the orientation of the smartphone at step S136 (Yes at step S136), then at step S138, the controller 10 releases the screen lock state and finishes the present procedure.

Thus, the smartphone 1 allows the user to change the orientation of the home screen by the simple operation and reduces the possibility that the orientation of the home screen is changed unintentionally. Accordingly, the user may input the gesture to set the screen lock state to the touch screen display 2 to determine the orientation of the home screen and put the screen into the lock state, thereby inhibiting the orientation of the home screen from being changed even when the user uses the smartphone 1 while lying, for example, and the orientation of the smartphone 1 turns in various directions.

The smartphone 1 releases the screen lock state when the orientation of the smartphone 1 changes, the touch gesture is detected, and the orientation of the screen and the orientation of the smartphone 1 coincide with each other. Accordingly, the user may release the screen lock state at arbitrary timing.

Figure 14:
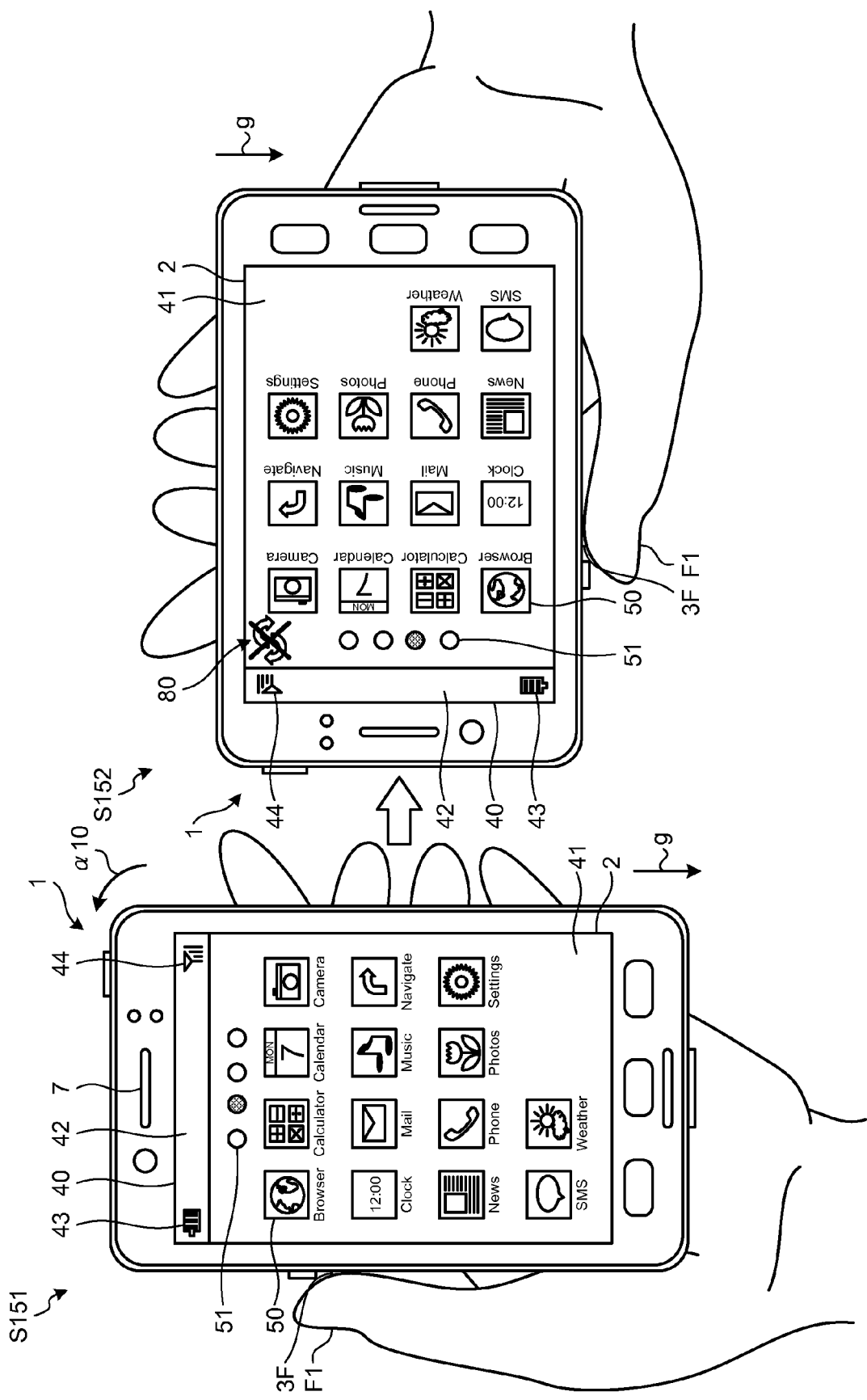
FIG. 14 is a view illustrating an example of the control to change the orientation of the screen.

The touch on the screen is made a part of the operation to shift to the screen lock state in the above-described embodiment; however, the embodiment is not limited thereto. The smartphone 1 may set the operation of the button 3 as a part of the operation to shift to the screen lock state. An example of the process is described with reference to FIGS. 14 and 15. In FIG. 14, the push (press) of the button 3F is set as a part of the operation to shift to the screen lock state.

At step S151 illustrated in FIG. 14, the home screen 40 is displayed on the touch screen display 2. The smartphone 1 at step S151 is arranged in the orientation in which the long side of the housing 20 is parallel to the vertical direction g. The home screen 40 is the screen corresponding to the portrait screen in which the long side of the touch screen display 2 is in the screen top-to-bottom direction and the side on which the receiver 7 is arranged is the upper side of the screen. In the smartphone 1 at step S151, the top-to-bottom direction of the housing 20 (vertical direction g) and the screen top-to-bottom direction of the home screen 40 coincide with each other.

At step S151, a finger F1 of the user pushes the button 3F. In this case, the smartphone 1 detects a push of the button 3F. The user maintains a state in which the finger F1 pushes the button 3F and rotates the smartphone 1, which is in the orientation illustrated at step S151, in a direction indicated by an arrow α10, that is to say, in the counterclockwise direction by approximately 90 degrees. That is to say, the user maintains the state in which the finger F1 pushes the button 3F and changes the orientation of the smartphone 1 from the orientation illustrated at step S151 to the orientation illustrated at step S152 around the line perpendicular to the surface of the touch screen display 2 as the axis. In this case, the smartphone 1 detects the touch on the home screen 40 and further detects that the housing 20 rotates by 90 degrees through the acceleration sensor 15. When the smartphone 1 detects the push of the button 3F, the smartphone 1 enters the screen lock state in which the orientation of the screen displayed on the touch screen display 2 is not changed even when it is detected that the housing 20 rotates by 90 degrees.

At step S152 illustrated in FIG. 14, the home screen 40 is displayed on the touch screen display 2. The smartphone 1 at step S152 is arranged in the orientation in which the short side of the housing 20 is parallel to the vertical direction g. The home screen 40 is the screen corresponding to the portrait screen in which the long side of the touch screen display 2 is in the top-to-bottom direction thereof. The home screen 40 is displayed on the touch screen display 2 in the orientation in which the top-to-bottom direction of the screen is in the horizontal direction. Therefore, in the smartphone 1 at step S152, the top-to-bottom direction of the housing 20 and the screen top-to-bottom direction of the home screen 40 do not coincide with each other. A mark 80 is displayed on the home screen 40. The mark 80 is a sign indicating that it is in the screen lock state.

When the smartphone 1 detects the push of the button 3F and further detects that the orientation of the housing 20 changes, the smartphone 1 enters the screen lock state as illustrated in FIG. 14. That is to say, the smartphone 1 does not change the orientation of the home screen 40 with respect to the touch screen display 2. Accordingly, the user may prevent the home screen 40 from rotating with respect to the touch screen display 2 even when the orientation of the housing 20 is changed, only by pushing the button 3F.

Figure 15:
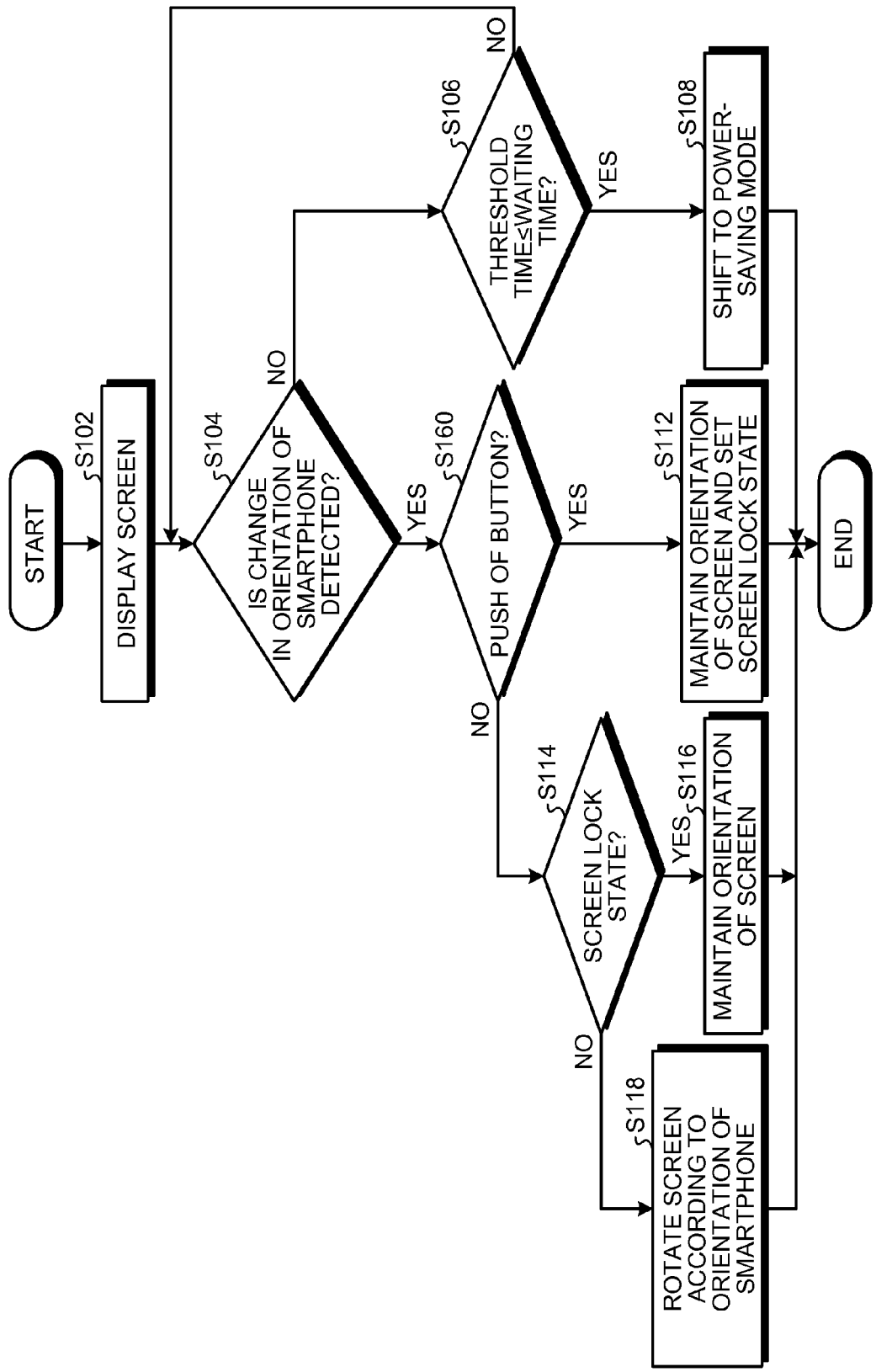
FIG. 15 is a flowchart illustrating the procedure of the control to change the orientation of the screen.

An example of the procedure of the control based on the function provided by the control program 9A is described with reference to FIG. 15. FIG. 15 illustrates the procedure of the control to change the orientation of the screen according to the instruction of the user. The procedure in FIG. 15 is similar to the process in FIG. 12 except a part of the procedure. Hereinafter, description focuses mainly on a point specific to the procedure in FIG. 15.

The controller 10 displays the screen on the touch screen display 2 at step S102. When the screen is displayed at step S102, the controller 10 detects the change in the orientation of the smartphone 1 at step S104.

When it is determined that the orientation has not been changed at step S104 (No at step S104), then at step S106, the controller 10 determines whether threshold time waiting time is satisfied. When it is determined that the waiting time is shorter than the threshold at step S106 (No at step S106), the controller 10 proceeds to step S104 to determine again whether the orientation of the smartphone 1 has been changed. When it is determined that the waiting time is equal to or longer than the threshold at step S106 (Yes at step S106), then at step S108, the controller 10 shifts to the power-saving mode and finishes the present procedure.

When it is determined that the orientation of the smartphone has been changed at step S104 (Yes at step S104), then at step S160, the controller 10 determines whether the button has been pushed. That is to say, the controller 10 determines whether the push of the button 3F is detected. When it is determined that the button has been pushed at step S160 (Yes at step S160), then at step S112, the controller 10 maintains the orientation of the screen and sets the screen lock state.

When it is determined that the button has not been pushed at step S160 (No at step S160), then at step S114, the controller 10 determines whether it is in the screen lock state. A process at step S114 and subsequent steps is similar to the process in the flowchart in FIG. 12.

As illustrated in FIGS. 14 and 15, the smartphone 1 may shift to the screen lock state without changing the orientation of the screen with respect to the touch screen display 2 when the smartphone 1 detects the push of the button 3F and the orientation of the smartphone 1 (orientation of the housing 20) changes. Thus, the smartphone 1 can be shifted to the screen lock state without inputting the gesture to the touch screen display 2 by using the push of the button 3 in place of the touch on the touch screen display 2.

When shifting to the screen lock state, the smartphone 1 may display the mark 80 to allow the user to easily understand that the smartphone 1 is in the screen lock state as illustrated at step S152 in FIG. 14. The smartphone 1 may display the mark 80 until the screen lock state is released or may hide the mark 80 a predetermined time after shifting to the screen lock state. By hiding the mark 80, the visibility of the screen displayed on the touch screen display 2 is improved. The smartphone 1 may also display the mark 80 when it is detected that the orientation of the housing 20 has been changed in the screen lock state.

The smartphone 1 of the above-described embodiment is configured to enter the screen lock state when the orientation of the housing changes and predetermined operation is detected and to change the orientation of the screen when the orientation of the housing changes and the predetermined operation is not detected; however, the embodiment is not limited thereto. The smartphone 1 may be configured to change the orientation of the screen when the orientation of the housing changes and the predetermined operation is detected and to enter the screen lock state when the orientation of the housing changes and the predetermined operation is not detected.

Figure 16:
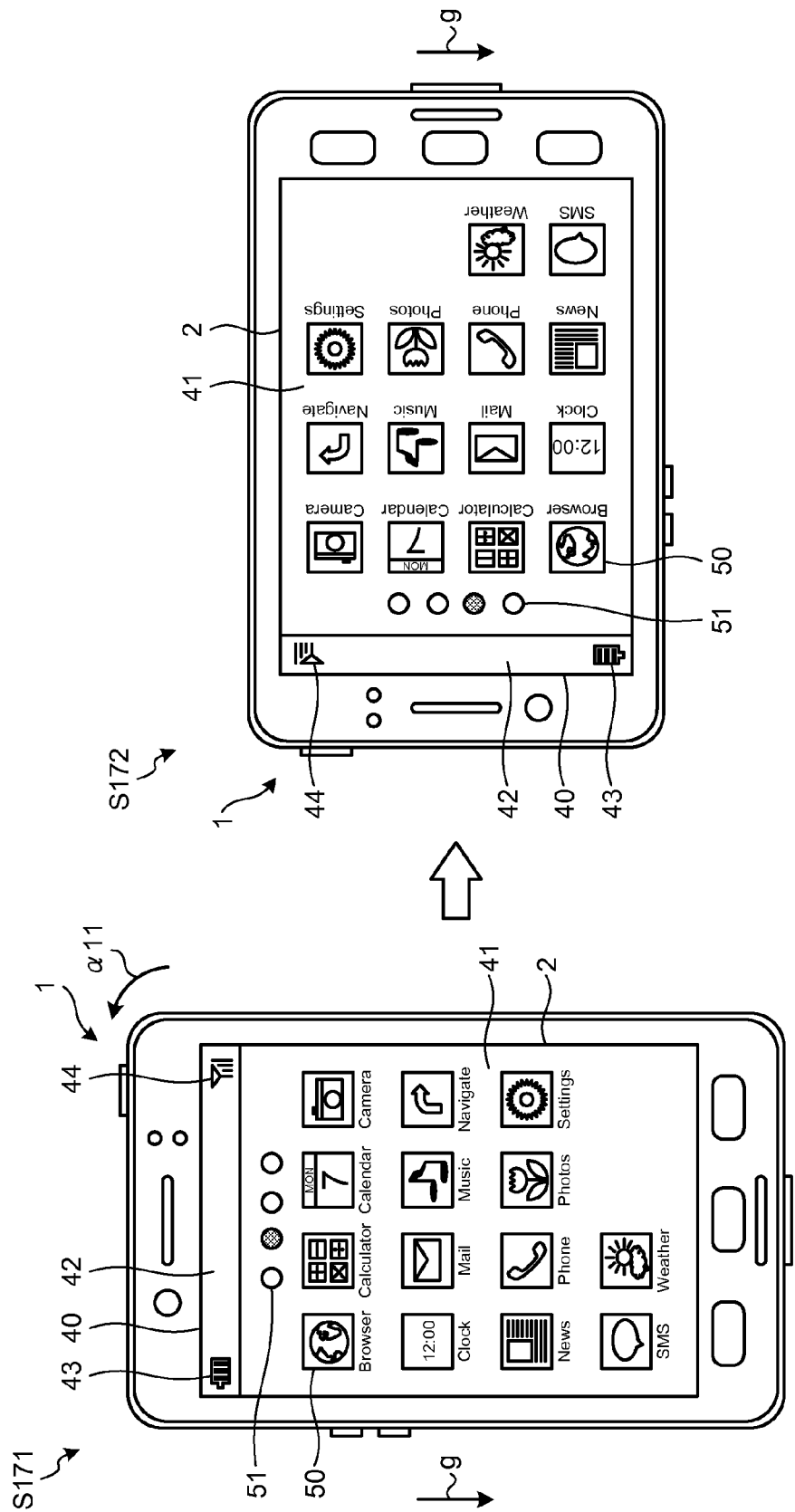
FIG. 16 is a view illustrating an example of the control to change the orientation of the screen.
Figure 17:
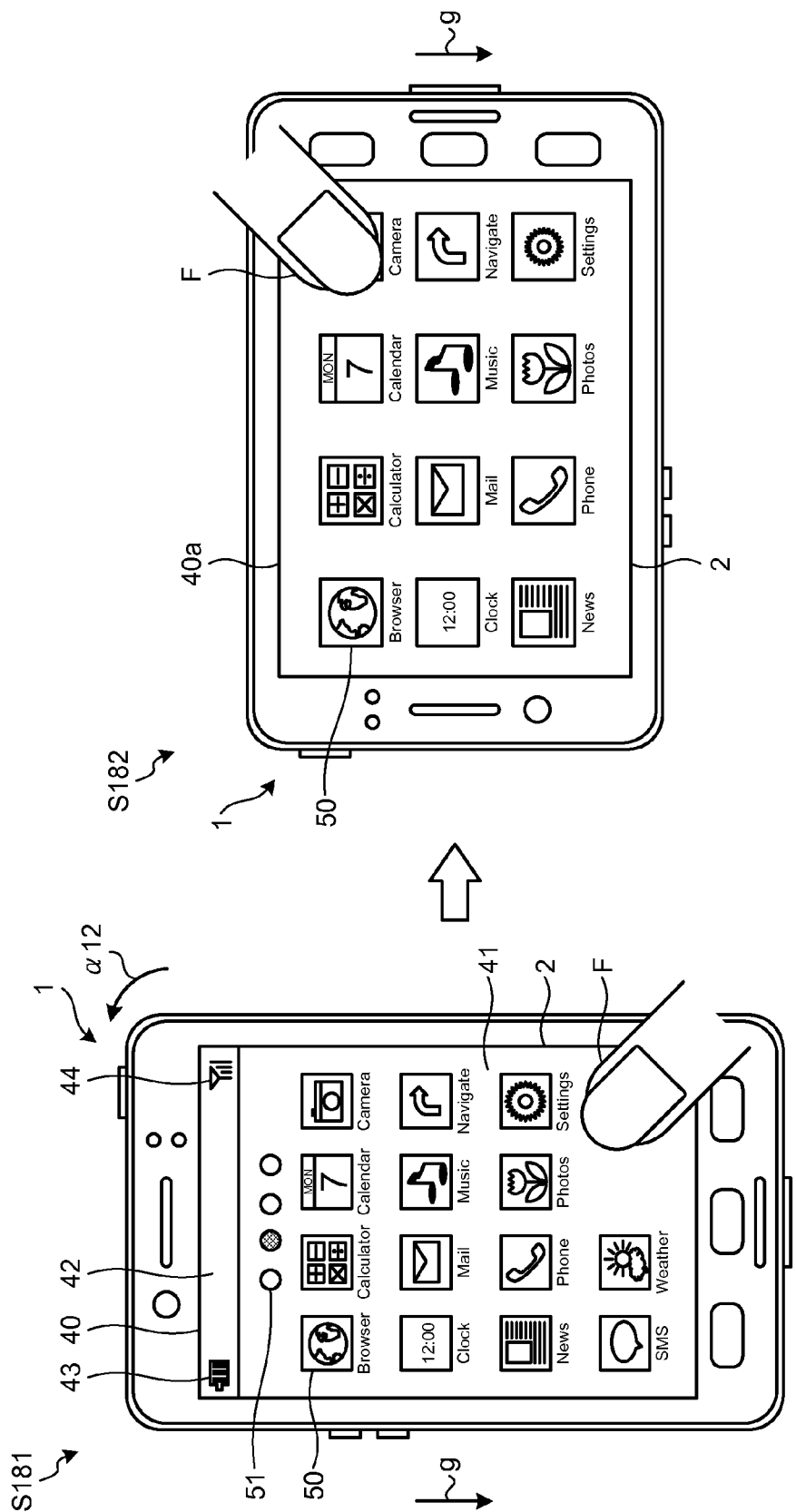
FIG. 17 is a view illustrating an example of the control to change the orientation of the screen.

Hereinafter, the description is given with reference to FIGS. 16 to 18. FIGS. 16 and 17 are views illustrating an example of the control to change the orientation of the screen. At step S171 illustrated in FIG. 16, the home screen 40 is displayed on the touch screen display 2. The smartphone 1 at step S171 is arranged in the orientation in which the long side of the housing 20 is parallel to the vertical direction g. In the smartphone 1 at step S171, the top-to-bottom direction of the housing 20 and the screen top-to-bottom direction of the home screen 40 coincide with each other.

The user rotates the smartphone 1, which is in the orientation illustrated at step S171, in a direction indicated by an arrow α11, that is to say, in the counterclockwise direction by approximately 90 degrees. That is to say, the user changes the orientation of the smartphone 1 from the orientation illustrated at step S171 to the orientation illustrated at step S172 around the line perpendicular to the surface of the touch screen display 2 as the axis. In this case, the smartphone 1 detects that the housing 20 rotates by 90 degrees through the acceleration sensor 15. When the smartphone 1 does not detect the touch on the home screen 40 upon detecting that the housing 20 rotates by 90 degrees, the smartphone 1 enters the screen lock state in which the orientation of the screen displayed on the touch screen display 2 is not changed even when it is detected that the housing 20 rotates by 90 degrees.

At step S172 illustrated in FIG. 16, the home screen 40 is displayed on the touch screen display 2. The smartphone 1 at step S172 is arranged in the orientation in which the short side of the housing 20 is parallel to the vertical direction g. The home screen 40 is the screen corresponding to the portrait screen in which the long side of the touch screen display 2 is in the top-to-bottom direction thereof. The home screen 40 is displayed on the touch screen display 2 in the orientation in which the top-to-bottom direction of the screen is in the horizontal direction. Therefore, in the smartphone 1 at step S172, the top-to-bottom direction of the housing 20 and the screen top-to-bottom direction of the home screen 40 do not coincide with each other.

When the smartphone 1 detects that the orientation of the housing 20 changes without detecting the touch on the home screen 40, the smartphone 1 enters the screen lock state as illustrated in FIG. 16. That is to say, the smartphone 1 does not change the orientation of the home screen 40 with respect to the touch screen display 2. Accordingly, the user may prevent the home screen 40 from rotating with respect to the touch screen even when the orientation of the housing 20 is changed.

At step S181 illustrated in FIG. 17, the home screen 40 is displayed on the touch screen display 2. The smartphone 1 at step S181 is arranged in the orientation in which the long side of the housing 20 is parallel to the vertical direction g as at step S171. The home screen 40 is the screen corresponding to the portrait screen in which the long side of the touch screen display 2 is in the screen top-to-bottom direction and the side on which the receiver 7 is arranged is on the upper side of the screen. In the smartphone 1 at step S181, the top-to-bottom direction of the housing 20 and the screen top-to-bottom direction of the home screen 40 coincide with each other.

At step S181, the finger F of the user touches the home screen 40. In this case, the smartphone 1 detects the touch on the home screen 40 through the touch screen 2B. The user maintains the state in which the finger F touches the home screen 40 and rotates the smartphone 1, which is in the orientation illustrated at step S181, in a direction indicated by an arrow α12, that is to say, in the counterclockwise direction by approximately 90 degrees. That is to say, the user maintains the state in which the finger F touches the home screen 40 and changes the orientation of the smartphone 1 from the orientation illustrated at step S181 to the orientation illustrated at step S182 around the line perpendicular to the surface of the touch screen display 2 as the axis. In this case, the smartphone 1 detects the touch on the home screen 40 and further detects that the housing 20 rotates by 90 degrees through the acceleration sensor 15. The smartphone 1 changes the orientation of the screen displayed on the touch screen display 2 based on the relationship between the orientation of the housing 20 and the orientation of the screen of the touch screen display 2 when the orientation of the housing 20 changes and the touch on the home screen 40 is detected.

At step S182 illustrated in FIG. 17, the home screen 40a is displayed on the touch screen display 2. The smartphone 1 at step S182 is arranged in the orientation in which the short side of the housing 20 is in the vertical direction. The home screen 40a is the screen obtained by rotating the home screen 40 in the counterclockwise direction by 90 degrees. The home screen 40a is the screen corresponding to the landscape screen in which the short side of the touch screen display 2 is in the top-to-bottom direction thereof. In the smartphone 1 at step S182, the top-to-bottom direction of the housing 20 and the screen top-to-bottom direction of the home screen 40a coincide with each other.

When the smartphone 1 detects the touch on the screen and further detects that the orientation of the housing 20 changes, the smartphone 1 changes the orientation of the home screens 40 and 40a displayed on the touch screen display 2 as illustrated in FIG. 17. Specifically, the smartphone 1 changes the orientation such that the screen top-to-bottom direction of the home screens 40 and 40a displayed on the touch screen display 2 coincides with the top-to-bottom direction of the housing 20, that is to say, the vertical direction. Accordingly, the user may display the home screens 40 and 40a on the touch screen display 2 of the smartphone 1 in the orientation in which the screen top-to-bottom direction is in the vertical direction only by touching the touch screen display 2.

The smartphone 1 enters the screen lock state or not depending on whether the touch on the home screen 40 is detected as illustrated in FIGS. 16 and 17. Accordingly, the user may rotate the home screen 40 with respect to the touch screen display 2 or not depending on whether the user touches on the touch screen display 2 when changing the orientation of the smartphone 1. Consequently, the user may select to rotate the home screen 40 with respect to the touch screen display 2 or not by the simple operation and display the screen in the desired orientation. Further, in the smartphone 1 illustrated in FIGS. 16 and 17, the screen is touched only when the orientation of the screen with respect to the touch screen display 2 is wanted to be changed. Therefore, the user may inhibit occurrence of unintended rotation of the screen.

An example of the procedure of the control based on the function provided by the control program 9A is described with reference to FIG. 18. FIG. 18 illustrates the procedure of the control to change the orientation of the screen according to the instruction of the user. The procedure illustrated in FIG. 18 is similar to the procedure in the flowchart in FIG. 12 except a part of the process. Hereinafter, the description is focused mainly on a point specific to the procedure in FIG. 18.

The controller 10 displays the screen on the touch screen display 2 at step S102. When the screen is displayed at step S102, then at step S104, the controller 10 detects the change in the orientation of the smartphone 1. When it is determined that the orientation has not been changed at step S104 (No at step S104), then at step S106, the controller 10 determines whether threshold time≤waiting time is satisfied.

When it is determined that the waiting time is shorter than the threshold, that is to say, that threshold time>waiting time is satisfied at step S106 (No at step S106), the controller proceeds to step S104 to determine again whether the orientation of the smartphone 1 has been changed. When it is determined that the waiting time is equal to or longer than the threshold at step S106 (Yes at step S106), then at step S108, the controller 10 shifts to the power-saving mode and finishes the present procedure.

When it is determined that the orientation of the smartphone has been changed at step S104 (Yes at step S104), then at step S110, the controller determines whether a touch gesture has been detected. When it is determined that the touch gesture has been detected at step S110 (Yes at step S110), then at step S190, the controller 10 determines whether it is in the screen lock state. When it is determined that it is in the screen lock state at step S190 (Yes at step S190), then at step S192, the controller 10 maintains the orientation of the screen. When the process at step S192 is done, the controller 10 finishes the present procedure.

When it is determined that it is not in the screen lock state at step S190 (No at step S190), then at step S194, the controller 10 rotates the screen according to the orientation of the smartphone. When the process at step S194 is done, the controller 10 finishes the present procedure.

When it is determined that the touch gesture has not been detected at step S110 (No at step S110), then at step S196, the controller 10 maintains the orientation of the screen and sets the screen lock state. That is to say, the controller 10 does not change the orientation of the screen and shifts to the screen lock state in which the screen is not rotated regardless of the orientation of the smartphone (housing 20) and finishes the present procedure.

Figure 18:
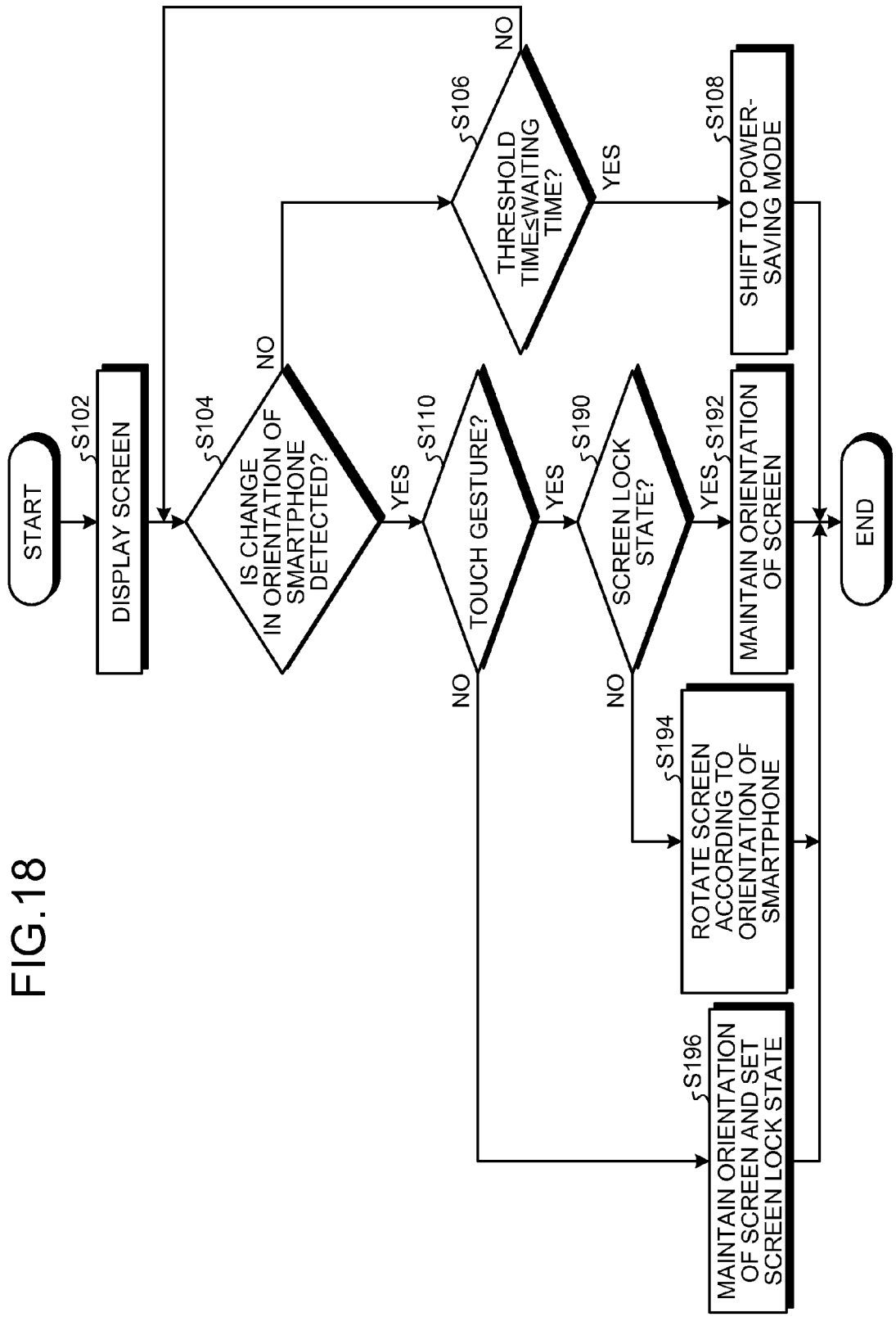
FIG. 18 is a flowchart illustrating the procedure of the control to change the orientation of the screen.

In a case of the example illustrated in FIGS. 16 to 18, the screen lock state may be released when the orientation of the screen and the orientation of the smartphone 1 coincide with each other. Accordingly, it is possible to rotate the screen according to the orientation of the smartphone 1 when the orientation of the smartphone 1 changes from the state in which the orientation of the screen and the orientation of the smartphone 1 coincide with each other and the touch gesture is detected.

The smartphone 1 detects the change in the orientation of the smartphone 1 (that is to say, the orientation of the housing 20) based on the detection result of the acceleration sensor 15; however, the embodiment is not limited thereto. The smartphone 1 may use various sensors as a sensor to detect the change in the orientation of the smartphone 1. For example, the smartphone 1 may detect the orientation of the smartphone 1 based on at least one of a detection result of the gyroscope 17 and a detection result of the orientation sensor 16.

The smartphone 1 may select, based on the setting, between a mode of entering the screen lock state when the smartphone 1 detects the operation such as the touch gesture upon detecting the change in the orientation of the smartphone 1 and a mode of rotating the screen when the smartphone 1 detects the operation such as the touch gesture when upon detecting the change in the orientation of the smartphone 1.

Figure 19:
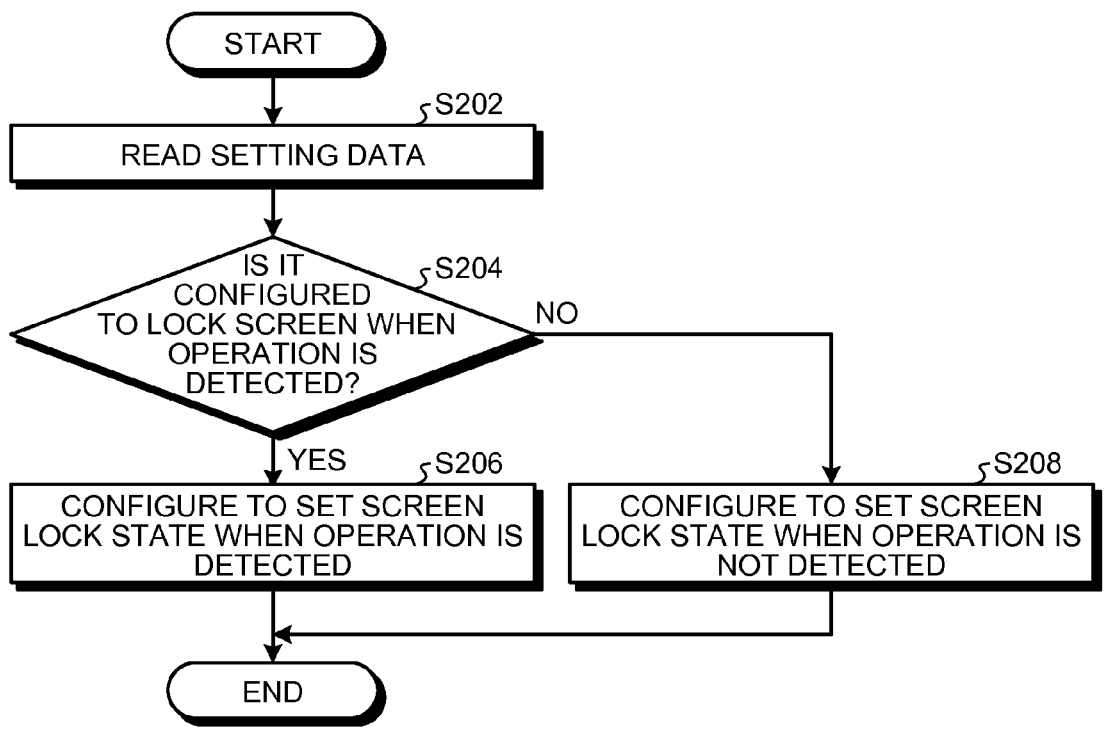
FIG. 19 is a flowchart illustrating the procedure of the control to change the orientation of the screen.

FIG. 19 is a flowchart illustrating the procedure of the control to change the orientation of the screen. FIG. 19 is a process to set a condition to change the orientation of the screen. The controller 10 reads the setting data at step S202. When the setting data is read at step S202, then at step S204, the controller 10 determines whether it is configured to lock the screen when an operation is detected. That is to say, it is determined whether it is configured to set the screen lock state to maintain the orientation of the screen in a case in which a predetermined operation is detected upon detecting the change in the orientation of the smartphone 1.

When it is determined that it is configured to lock the screen in a case in which the operation is detected at step S204 (Yes at step S204), then at step S206, the controller 10 is configured to set the screen lock state when the operation is detected, that is to say, configured to rotate the screen in a case in which an operation such as the touch gesture is not detected upon detecting the change in the orientation of the smartphone 1, and finishes the present procedure. In this case, the controller 10 is configured to execute the process illustrated in FIG. 12.

When it is determined that it is not configured to lock the screen in a case in which the operation is detected at step S204 (No at step S204), then at step S208, the controller 10 is configured to set the screen lock state when the operation is not detected, that is to say, configured to rotate the screen in a case in which an operation such as the touch gesture is detected upon detecting the change in the orientation of the smartphone 1, and finishes the present procedure. In this case, the controller 10 is configured to execute the process illustrated in FIG. 18.

As illustrated in FIG. 19, the smartphone 1 may be configured to change the procedure to be executed out of the above-described procedures by the setting, thus achieving settings for the user to easily use the smartphone 1.

The smartphone 1 may set the screen lock state or not depending on whether a predetermined operation is detected when the orientation of the smartphone 1 (housing 20) changes, as described above. That is to say, the smartphone 1 may set the screen lock state or not when two operations, which are the change in the orientation of the smartphone 1 (housing 20) and detection of the predetermined operation, are simultaneously detected. Accordingly, the smartphone 1 may intuitively associate the operation with the process to be executed. Further, it is possible to reduce the possibility that the smartphone 1 unintentionally shifts to the screen lock state.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen; however, the device according to the appended claims is not limited to the smartphone. The device according to the appended claims may be a mobile communication device other than the smartphone, for example, a mobile communication having a plurality of communication unit. Examples of the mobile communication devices include, but are not limited to, mobile phones, tablets, mobile personal computers, digital cameras, media players, electronic book readers, navigators, and gaming devices. The communication device according to the appended claims may be a stationary-type communication device. Examples of the stationary-type communication devices include, but are not limited to, desktop personal computers, and television receivers.

Although the smartphone 1 provided with the touch screen display 2 is described in the above-described embodiment, the display 2A, which is not provided with the touch screen 2B, may be used as a display unit.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:
1. A device, comprising:
   a housing;
   a display unit configured to display a screen;
   a sensor configured to detect an inclination of the housing;
   an operating unit configured to detect an operation including a touch on the screen; and a controller configured to change an orientation of the screen depending upon the inclination detected through the sensor and the touch detected through the operating unit,
   wherein,
      in response to detecting, by the operating unit, that the touch is a continuous touch maintained on the screen during the inclination of the housing,
         the controller is configured to lock the screen in a lock state in which the orientation of the screen is fixed relative to the orientation of the display unit, and
   wherein, in the lock state of the screen,
      in response to detecting the continuous touch and the inclination of the housing through the operating unit and the sensor,
         the controller is configured to maintain the lock state of the screen upon (a) release of the continuous touch and (b) detecting that the orientation of the screen is different from the orientation of the display unit, and
         the controller is configured to, upon (c) release of the continuous touch and (d) detecting that the orientation of the screen coincides with the orientation of the display unit, (i) release the lock state of the screen, and (ii) maintain an unlocked state of the screen so that the orientation of the screen changes in accordance with the inclination of the housing as detected by the sensor.
2. The device according to claim 1, wherein
in the unlocked state of the screen,
   when the orientation of the screen is different from that of the display unit and the operating unit detects no touch on the screen, the controller is configured to change the orientation of the screen in accordance with the inclination of the housing as detected by the sensor.

3. The device according to claim 2, wherein when a time within which the operating unit detects no touch on the screen becomes longer than a threshold time, the controller is configured to release the lock state in which the orientation of the screen is fixed relative to the orientation of the display unit.

4. The device according to claim 1, wherein the controller is configured to switch between a first setting to maintain the orientation of the screen when the operating unit detects no touch on the screen and a second setting to change the orientation of the screen when the operating unit detects no touch on the screen.

5. The device according to claim 1, wherein, in the lock state, the controller is configured to maintain the orientation of the screen when the operating unit detects no touch on the screen.

6. The device according to claim 5, wherein, when the orientation of the screen is different from that of the display unit, the controller is configured to
in the unlocked state, when the operating unit detects no touch on the screen, change the orientation of the screen.

7. The device according to claim 1, wherein the operating unit is a touch screen superimposed on the display unit.

8. The device according to claim 1, wherein
the controller is configured to release the lock state of the screen in response to shifting the device to a power-saving mode.

9. The device according to claim 1, wherein
the controller is configured to release the lock state of the screen in response to displaying a screen to be executed by another application in place of a currently displayed screen.

10. The device according to claim 1, wherein, in the lock state of the screen,
in response to detecting (ii) the continuous touch and the inclination of the housing through the operating unit and the sensor, and (ii) that the orientation of the screen is different from that of the display unit,
the controller is configured to maintain the lock state of the screen upon release of the continuous touch and the inclination of the housing is changed according to a rotation of the device.

11. A method of controlling a device provided with a housing, a sensor, an operating unit, and a display unit, the method comprising:
displaying a screen on the display unit,
detecting an inclination of the housing through the sensor; and
changing an orientation of the screen depending upon the inclination detected through the sensor, and
an operation detected through the operating unit;
wherein
the operation detected through the operating unit includes a touch on the screen, in response to detecting, by the operating unit, that the touch is a continuous touch maintained on the screen during the inclination of the housing,
the screen is locked in a screen lock state in which the orientation of the screen is fixed relative to the orientation of the display unit,
in the screen lock state, in response to detecting the continuous touch and the inclination of the housing through the operating unit and the sensor,
the screen lock state of the screen is maintained upon (a) release of the continuous touch and (b) detecting that the orientation of the screen is different from the orientation of the display unit, and
the screen lock state is released in response to shifting the device to a power-saving mode.

12. The method according to claim 11, wherein,
in a screen unlock state,
when the orientation of the screen is different from that of the display unit and the operating unit detects no touch on the screen, the changing includes
changing the orientation of the screen in accordance with the inclination of the housing as detected by the sensor.

13. The method according to claim 11, further comprising,
in the screen lock state,
in response to detecting (i) the continuous touch and the inclination of the housing through the operating unit and the sensor, and (ii) that the orientation of the screen coincides with that of the display unit,
releasing the screen lock state and maintaining an unlocked state of the screen upon release of the continuous touch so that the orientation of the screen changes in accordance with the inclination of the housing as detected by the sensor.

14. The method according to claim 11, wherein the screen lock state is released in response to displaying a screen to be executed by another application in place of a currently displayed screen.

15. The method according to claim 11, wherein in the screen lock state,
in response to detecting (i) the continuous touch and the inclination of the housing through the operating unit and the sensor, and (ii) that the orientation of the screen is different from that of the display unit,
the screen lock state of the screen is maintained upon release of the continuous touch and the inclination of the housing is changed according to a rotation of the device.

16. A non-transitory storage medium that stores a program for causing, when executed by a device provided with a housing, a sensor, an operating unit, and a display unit, the device to execute:
displaying a screen on the display unit;
detecting an inclination of the housing through the sensor;
changing an orientation of the screen depending upon the inclination detected through the sensor,
an operation detected through the operating unit:
wherein
the operation detected through the operating unit includes a touch on the screen,
in response to detecting, by the operating unit, that the touch is a continuous touch maintained on the screen during the inclination of the housing,
the screen is locked in a screen lock state in which the orientation of the screen is fixed relative to the orientation of the display unit,
in the screen lock state, in response to detecting the continuous touch and the inclination of the housing through the operating unit and the sensor,
the screen lock state of the screen is maintained upon (a) release of the continuous touch and (b) detecting that the orientation of the screen is different from the orientation of the display unit, and
the screen lock state is released in response to displaying a screen to be executed by another application in place of a current displayed screen.

17. The storage medium according to claim 16, wherein the program, when executed by the device, further causes the device to execute,
  in a screen unlock state,
    when the orientation of the screen is different from that of the display unit and the operating unit detects no touch on the screen,
      changing the orientation of the screen in accordance with the inclination of the housing as detected by the sensor.

18. The non-transitory storage medium according to claim 16, wherein the program, when executed by the device, further causes the device to execute, in the screen lock state,
  in response to detecting (i) the continuous touch and the inclination of the housing through the operating unit and the sensor, and (ii) that the orientation of the screen coincides with that of the display unit,
    releasing the screen lock state and maintaining an unlocked state of the screen upon release of the continuous touch so that the orientation of the screen changes in accordance with the inclination of the housing as detected by the sensor.

19. The non-transitory storage medium according to claim 16, wherein the program, when executed by the device, further causes the device to execute
  releasing the screen lock state in response to shifting the device to a power-saving mode.

20. The non-transitory storage medium according to claim 16, wherein in the screen lock state,
  in response to detecting (i) the continuous touch and the inclination of the housing through the operating unit and the sensor, and (ii) that the orientation of the screen is different from that of the display unit,
    the screen lock state of the screen is maintained upon release of the continuous touch and the inclination of the housing is changed according to a rotation of the device.

* * * * *